US 8,433,929 B2

(12) United States Patent
Yamashita

(10) Patent No.: US 8,433,929 B2
(45) Date of Patent: Apr. 30, 2013

(54) DATA MANAGEMENT DEVICE, STORED DATA MANAGEMENT METHOD AND COMPUTER PROGRAM

(75) Inventor: Ken Yamashita, Nara (JP)

(73) Assignee: Panasonic Corporation, Osaka (JP)

( * ) Notice: Subject to any disclaimer, the term of this patent is extended or adjusted under 35 U.S.C. 154(b) by 383 days.

(21) Appl. No.: 12/596,172

(22) PCT Filed: Apr. 3, 2008

(86) PCT No.: PCT/JP2008/000865
§ 371 (c)(1),
(2), (4) Date: Oct. 16, 2009

(87) PCT Pub. No.: WO2008/132772
PCT Pub. Date: Nov. 6, 2008

(65) Prior Publication Data
US 2010/0138933 A1    Jun. 3, 2010

(30) Foreign Application Priority Data
Apr. 19, 2007  (JP) .................................. 2007-110226

(51) Int. Cl.
*G06F 11/30* (2006.01)
(52) U.S. Cl.
USPC ............ 713/193; 713/156; 713/157; 713/175
(58) Field of Classification Search .................. 713/193, 713/156–157, 175; 726/26, 29–30; 705/50
See application file for complete search history.

(56) References Cited

U.S. PATENT DOCUMENTS

| 6,335,742 | B1 |   | 1/2002  | Takemoto |         |
|-----------|----|---|---------|----------|---------|
| 6,865,431 | B1 | * | 3/2005  | Hirota et al. | 700/94 |
| 2004/0117309 | A1 | * | 6/2004 | Inoue et al. | 705/50 |
| 2007/0177491 | A1 |   | 8/2007 | Honda et al. |       |
| 2007/0226399 | A1 |   | 9/2007 | So et al.   |       |
| 2007/0300078 | A1 |   | 12/2007 | Ochi et al. |       |
| 2009/0103902 | A1 | * | 4/2009 | Matsuura et al. | 386/124 |

(Continued)

FOREIGN PATENT DOCUMENTS

| EP | 1818833  | 8/2007 |
| JP | 9-044387 | 2/1997 |

(Continued)

OTHER PUBLICATIONS

English language Abstract of JP 2001-325134, Nov. 22, 2001.

(Continued)

*Primary Examiner* — Samson Lemma
(74) *Attorney, Agent, or Firm* — Greenblum & Bernstein, PLC

(57) ABSTRACT

Provided is a data management device for managing data recorded onto a readable and writable recording medium by an application that is verified based on a digital certificate. The recording medium has a plurality of areas and access to each area is restricted to a different application. The data management device includes an application authentication module, a mapping module, and a local storage display module. The application authentication module verifies that an application is an authentic application based on a digital certificate attached to the application. The mapping module associates, if the application is verified, an area accessible by the application with a subject name described in the digital certificate used for the verification. The local storage display module displays information regarding the area accessible by the application, with the use of the subject name associated with the area.

19 Claims, 27 Drawing Sheets

U.S. PATENT DOCUMENTS

| | | | |
|---|---|---|---|
| 2009/0222674 A1* | 9/2009 | Leichsenring et al. | 713/193 |
| 2010/0031347 A1* | 2/2010 | Ohto | 726/19 |
| 2010/0049992 A1* | 2/2010 | Leichsenring et al. | 713/193 |

FOREIGN PATENT DOCUMENTS

| | | |
|---|---|---|
| JP | 11-096194 | 4/1999 |
| JP | 2001-325134 | 11/2001 |
| WO | 2005/088446 | 9/2005 |
| WO | 2006/085647 | 8/2006 |

OTHER PUBLICATIONS

English language Abstract of JP 11-096194, Apr. 9, 1999.
English language Abstract of JP 09-044387, Feb. 14, 1997.
"The dictionary—Authentication Framework", CCITT Recommendation X. 509 (1988), Nov. 1988, pp. 1-30.

* cited by examiner

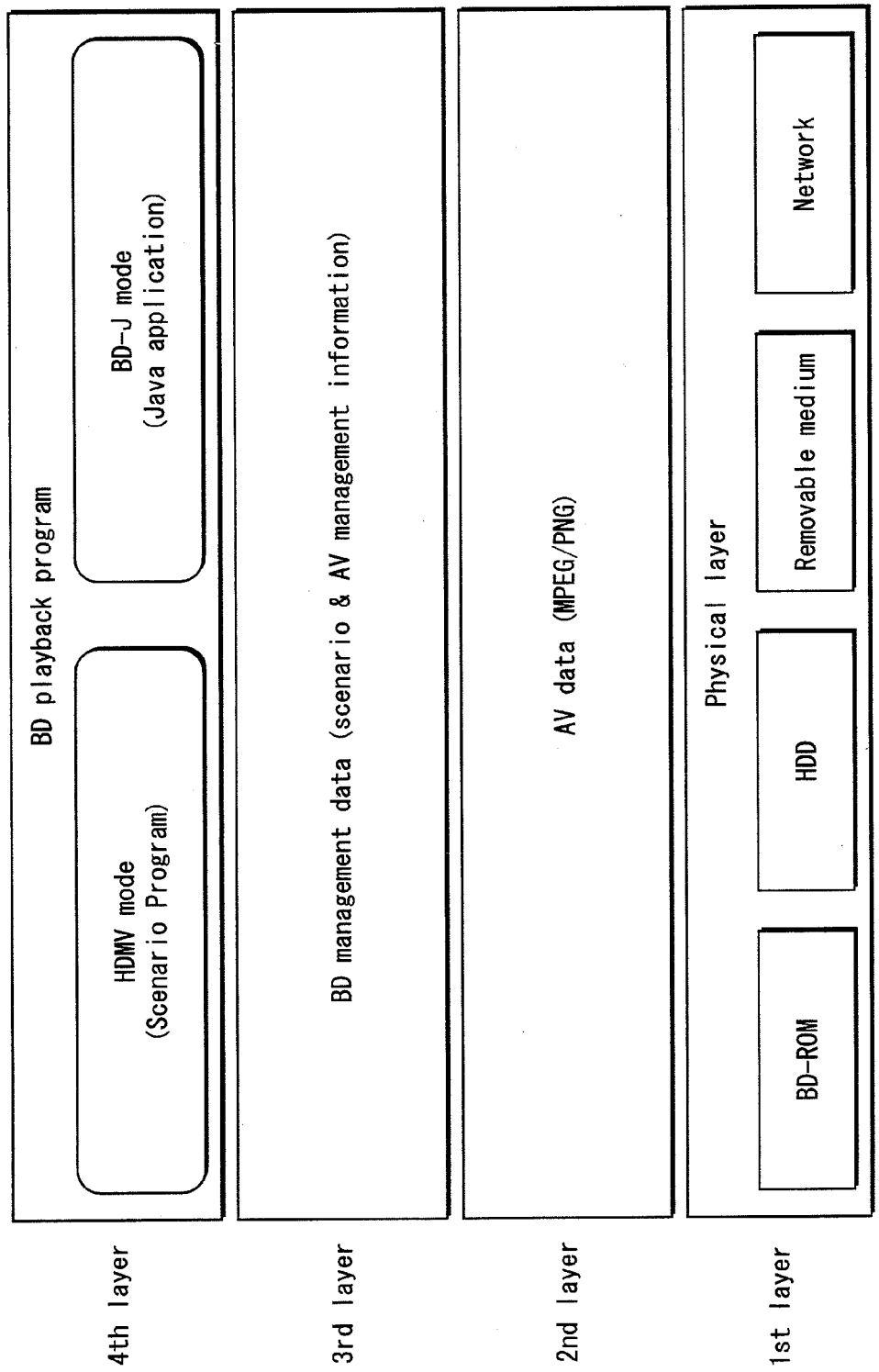

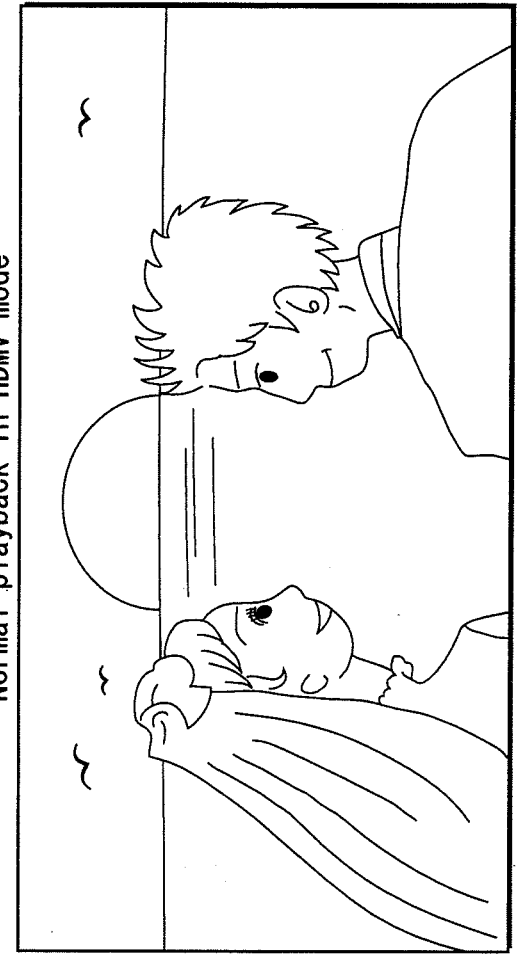
FIG. 10A  Normal playback in HDMV mode
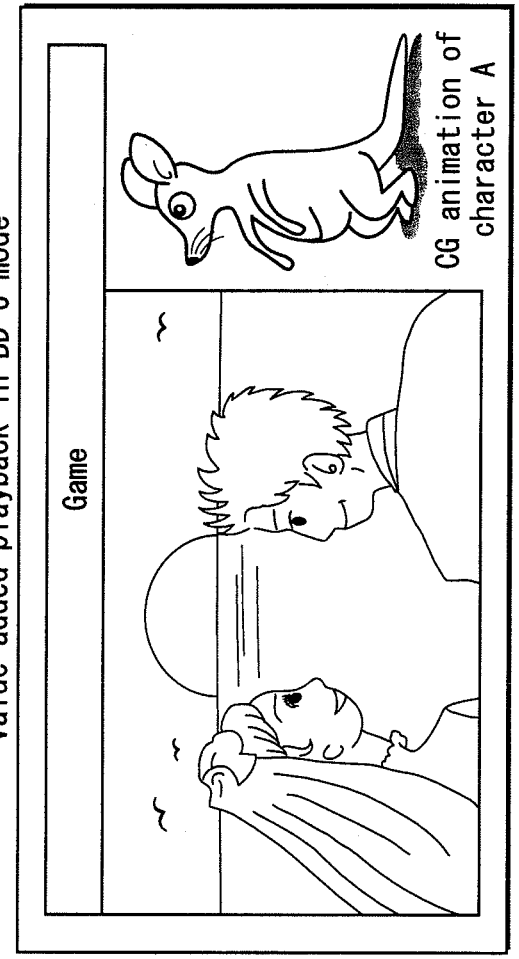
FIG. 10B  Value-added playback in BD-J mode

FIG. 15

| CertID directory | Subject name of application root certificate |
|---|---|
| 081a24ed | aaa Studios |

FIG. 16

| CertID directory | Subject name of application root certificate | OrganizationID directory | Subject name of leaf certificate |
|---|---|---|---|
| 081a24ed | aaa Studio | 56789abc | bbb.Software Inc. |
| | | 56789aaa | ccc.Software Inc. |
| 265A738F | bbb Studio | 56789abc | ddd.Software Inc. |

FIG. 20

| CertID directory | Subject name of application root certificate | OrganizationID directory | Subject name of leaf certificate | AppID directory | Application name in application management table | Application icon in application management table |
|---|---|---|---|---|---|---|
| 081a24ed | aaa Studio | 56789abc | bbb. Software Inc. | 4000 | Shooting_game | ☻ |
| | | | | 4003 | BookMark_app | ☀ |
| | | 56789aaa | ccc. Software Inc. | | | |
| 265A738F | bbb Studio | 56789abc | ddd. Software Inc. | 67ac | The_EPG_app | |

FIG. 27

| CertID directory | Disc creator information in metafile | Subject name of application root certificate | OrganizationID directory | Title creator information in metafile | Subject name of leaf certificate |
|---|---|---|---|---|---|
| 081a24ed | abc Studio | aaa Studio | 56789abc | bbc. Software Inc. | bbb. Software Inc. |
|  |  |  | 56789aaa |  | ccc. Software Inc. |
| 265A738F |  | bbb Studio | 56789abc |  | ddd. Software Inc. |

FIG. 29

| CertID directory | Metafile used | Subject name of application root certificate | OrganizationID directory | Subject name of leaf certificate |
|---|---|---|---|---|
| 081a24ed | bdmt_eng.xml | aaa Studio | 56789abc | bbb. Software Inc. |
| | | | 56789aaa | ccc. Software Inc. |
| 265A738F | bd2_eng.xml | | 56789abc | |

DATA MANAGEMENT DEVICE, STORED DATA MANAGEMENT METHOD AND COMPUTER PROGRAM

TECHNICAL FIELD

The present invention relates to a technique for managing data that is stored to a readable and writable recording medium as a result of executing an application program. In particular, the present invention relates to a technique for presenting the states of the stored data in a manner to allow users to infer the contents of the stored data.

BACKGROUND ART

In recent years, one content provision method has become main stream for supplying playback contents to consumer devices that are for playback of AV streams and typified by BD-ROM players. A playback content supplied according to the method includes an application program (hereinafter "application") in addition to an AV stream in order to improve the interactivity.

Such a playback device is provided with a readable and writable recording medium, such as a hard disk, that is freely readable and writable by applications (hereinafter, "local storage") and capable of storing the intermediate state of an application and settings of the device to the local storage. One example is directed to an application that executes a shooting game related to a content during playback of an AV stream, by presenting a screen overlaid on the AV playback screen. This application may store high scores of the game to the local storage. In another example directed to an application for allowing a user to register his/her favorite scenes, the application may store information indicating search points of a stream to the local storage.

Note that the capacity of a local storage differs depending on the manufacturer. Yet, it is commonly expected that the local storage will eventually run out of available space after the long-term use of the BD-ROM player and storing data piece after piece. One measure against the problem of an insufficient memory area is to provide a function of automatically erasing data with reference, for example, to information regarding the usage history of the user. Yet, this measure is not preferable because of the risk that data is erased against the user's intention.

Another measure is to provide a function of allowing the user to manually erase unnecessary data. In order to provide such a function of manually erasing data, it is then required to provide a method for presenting, to the user, the state of the storage area on the local storage in a manner that the user can specify a specific piece of data stored on the local storage.

One known method for displaying data stored in a storage area is disclosed in Patent Literature 1. According to the method disclosed in Patent Literature 1, each file is provided with file identification information embedded therein and the respective pieces of file identification information are displayed instead of their file names.

Patent Literature 1: JP Patent Application Publication No. 09-44387

DISCLOSURE OF THE INVENTION

Problems the Invention is Attempting to Solve

It should be noted, however, that addition of file identification information to each file becomes another factor for causing the shortage of the storage area. In addition, applications contained in BD-ROM packages that are already distributed are not configured to embed file identification information and thus not capable of executing such a display method.

In view of the above, it may be one general alternative to use the file names and directory names to display data stored to the local storage by an application contained in an existing BD-ROM package. Yet, the file names and directory names may not match the data contents or may not be understandable to users. Rather, it is quit possible that the users are not able to identify data by the file names and directory name.

Especially, in the case of a BD-ROM player, each application is permitted to access only limited directories in the local storage, for the security reason. Judgments regarding the access control are made with the use of the directory names. Therefore, it is stipulated that a digest value of specific information, an ID number, or the like is used as a directory name. Therefore, it may be extremely difficult for users to infer the data contents from such a directory name.

FIGS. 1 and 2 each show an example of a display screen presenting information regarding the data stored on the local storage of a BD-ROM player, by using the directory names and file names of data files stored by an application. Since the file paths presented on these display examples are not readily understandable, the users cannot determine what kind of data is the data targeted to be processed.

The present invention is made in view of the above problems and aims to provide a data management device, data management method, and computer program each of which is capable of easily displaying the state of the recording area on the local storage, with the use of existing information in a manner to enable the users to readily infer the data contents.

Means for Solving the Problems

In order to achieve the above aim, the present invention provides a data management device for managing data written into a restricted area on a readable and writable recording medium by executing application programs. The restricted area is protected against any access other than by application programs verified based on digital certificates, and each of a plurality of directories within the restricted area is accessible by a different one of the application programs. The data management device includes: a verification unit operable to verify authenticity of an application program based on a digital certificate attached to the application program; a mapping unit operable, if the application program is verified, to associate (i) a directory accessible by the application program out of the plurality of directories with (ii) text information that is included in the digital certificate used for the verification and that relates to an owner of the digital certificate; and a presentation unit operable to present information relating to data written into the directory accessible by the application program, by using the text information associated with the directory. The digital certificate is composed of a plurality of certificate portions. The partial certificates include (i) a root certificate portion verifying a subordinate certificate portion and (ii) a leaf certificate portion being verified by a superordinate certificate portion. Each certificate portion has, as the text information, subject name information described therein. The digital certificate attached to the application program includes information specifying (i) an organization directory superordinate to an application directory into which data is written by executing the application program, and (ii) a root certificate directory superordinate to the specified organization directory, and the directly accessible by the application program is the application directory that is subordinate to the specified organization directory that in turn is subordinate to the specified root certificate directory. The association by the mapping unit is to associate the specified organization directory with the subject name information described in the leaf certificate, and the specified root certificate directory with the subject name information described in the root certificate.

Effects of the Invention

With the above configuration, the data management device according to the present invention presents information regarding the data recorded on the recording medium, by using text information relating to the recipient of the digital certificate. The text information helps the user to infer the data contents.

Further, the above configuration does not require any additional trouble for storing data because it is not required that information used for suggesting the data contents be registered by the user or acquired from an external source. Instead, the verified certificate is used, so that accurate information is presented to the user.

Consequently, the data management device according to the present invention is capable of presenting, in a simplified manner, information that allows the user to readily identify the contents of data stored on the recording medium.

A digital certificate in the widely-used X.509 certificate format includes the subject name that specifies the name of the creator of the application program and the name of the higher organization. Those names help the user to infer the data contents.

Generally, the BD-ROM player executes the access control, so that access by an application program to the root certificate directory and the Organization directory on the local storage is restricted based on the information described in the root and leaf certificates attached to the application program.

Consequently, as long as an application program is a verified application program, the respective directories are duly associated with appropriate certificates of the application program. Thus, information regarding data written by the application program is displayed by using the creator name of the application program and the name of the studio created the BD-ROM package. The creator name is specified by the subject name information described in the root certificate, and the studio name is specified by the subject name information described in the leaf certificate.

Optionally, the association is established by using an information item selected out of a country name, an organization name, an organization unit, and a common name that are included in the subject name information.

With the above configuration, information regarding the data stored on the local storage is presented with the use of a specific piece of information, which is one of the country name, the organization name, the organization unit, and the common name. Since such specific information is displayed, the user can easily infer the contents of the data.

Optionally, the mapping unit is operable to associate the specified organization directory with the subject name information described in the leaf certificate portion, by using a text string that is obtained by removing, from the organization name included in the subject name information, an organization ID attached at an end of the organization name.

The text string is composed of the organization name and the Organization ID attached at the end of the organization name. The Organization ID identifies the creator of the application program. Thus, by removing the Organization ID from the text string and presenting the remaining text string, the user is enabled to understand the data contents even more easily.

Optionally, the mapping unit is operable to receive a user selection selecting which of the information items included in the subject name information is to be used in the association.

With the above configuration, the user is allowed to actively select information to be associated with the respective directories, which enables the user to understand the data contents even more easily.

Optionally, the application program is included in a virtual package created by merging (i) data on a disc loaded into a playback device that executes the application program with (ii) data on the recording medium that the playback device is provided with. The virtual package includes application management information indicating details of the application program. The mapping information is further operable to associate the application directory with a name of the application program indicated by the application management information.

With the above configuration, information regarding the data stored on the local storage is presented with the use of the name of the application program by which the data is written. As a result, the user is enabled to understand the data contents even more easily.

Optionally, the application program is included in a virtual package created by merging (i) data on a disc loaded into a playback device that executes the application program with (ii) data on the recording medium that the playback device is provided with. The virtual package includes application management information indicating details of the application program. The mapping unit is further operable to associate the application directory with information relating to an icon that is specified by the application management information as denoting the application program.

With the above configuration, information regarding the data stored on the local storage is presented with the use of an icon visually representing the application program. As a result, the user is enabled to understand the data contents even more easily.

Optionally, the verification of the application program by the verification unit is processed before the application program is activated for execution. The association by the mapping unit is performed with the verification process.

With the above configuration, at the time when an application is executed, appropriate information is associated with the area into which data is written by the application. This eliminates the undesirable possibility that no association is established regarding an application program having written data and that the association is uselessly established regarding an application program which has not been executed and thus written no data.

Optionally, the application program is included in a virtual package created by merging (i) data on a disc loaded into a playback device that executes the application program with (ii) data on the recording medium that the playback device is provided with. The virtual package includes a metafile indicating details of the application program. The mapping unit is further operable to establish the association by using information contained in the metafile.

Optionally, the mapping unit is operable to establish the association by using text information relating to a recipient of the digital certificate and included in the digital certificate, if the virtual package does not include the metafile.

With the above configuration, information regarding the data is presented with the use of more detailed information stored in a metafile, rather than the limited information described in the digital certificate.

Optionally, the data management device further includes a text-string receiving unit operable to receive a user input of a text string. The mapping unit is operable, if the application program is verified, to receive a user input selecting whether or not text information relating to the owner of the digital certificate is to be used in the association, the mapping unit being further operable to use the text string received by the text-string receiving unit in the association, if the received user input indicates not to use the received text information.

Optionally, the text-string receiving unit is operable to receive input of the text-string via an entry field presented on a display screen. The entry field is presented by default with a text string contained in the subject-name information.

With the above configuration, more appropriate information is presented for the user to understand the data contents.

In another aspect, the present invention provides a computer program for controlling a computer to manage data written into a restricted area on a readable and writable recording medium by executing application programs. The restricted area is protected against any access other than by application programs verified based on digital certificates, and each of a plurality of directories within the restricted area being accessible by a different one of the application programs. The computer program includes code operable to cause the computer to perform: a verification step of verifying authenticity of an application program based on a digital certificate attached to the application program; a mapping step of associating, if the application program is verified, (i) a directory accessible by the application program out of the plurality of directories with (ii) text information that is included in the digital certificate used for the verification and that relates to an owner of the digital certificate; and a presentation step of presenting information relating to data written into the directory accessible by the application program, by using the text information associated with the directory.

With the above configuration, information regarding data recorded on the recording medium is presented with the use of text information regarding the recipient of a digital certificate attached to an application program that has written the data. The use of such text information helps the user to reasonably infer the data contents.

Further, the above configuration does not require any additional trouble for storing data because it is not required that information used for suggesting the data contents be registered by the user or acquired from an external source. Instead, the verified certificate is used, so that accurate information is presented to the user.

Consequently, the computer program according to the present invention is capable of causing, in a simplified manner, the computer to present information that allows the user to reasonably identify the contents of data stored on the recording medium.

In another aspect, the present invention provides a data management method for managing data written into a restricted area on a readable and writable recording medium by executing application programs. The restricted area is protected against any access other than by application programs verified based on digital certificates, and each of a plurality of directories within the restricted area being accessible by a different one of the application programs. The data management method includes: a verification step of verifying authenticity of an application program based on a digital certificate attached to the application program; a mapping step of associating, if the application program is verified, (i) a directory accessible by the application program out of the plurality of directories with (ii) text information that is included in the digital certificate used for the verification and that relates to an owner of the digital certificate; and a presentation step of presenting information relating to data written into the directory accessible by the application program, by using the text information associated with the directory.

With the above configuration, the data management method according to the present invention presents information regarding the data recorded on the recording medium, by using text information relating to the recipient of the digital certificate. The text information helps the user to infer the data contents.

Further, the above configuration does not require any additional trouble for storing data because it is not required that information used for suggesting the data contents be registered by the user or acquired from an external source. Instead, the verified certificate is used, so that accurate information is presented to the user.

Consequently, the data management method according to the present invention ensures to present, in a simplified manner, information that allows the user to reasonably identify the contents of data stored on the recording medium.

BRIEF DESCRIPTION OF THE DRAWINGS

FIG. 9 shows the software layer model of a playback device 200;

FIGS. 10A and 10B each show a scene of a movie created as a result of dynamic playback control in one of two modes of the playback device 200;

FIG. 15 shows one example of mapping information associating a CertID directory with subject name information described in an application root certificate;

FIG. 16 shows one example of the mapping information associating an OrganizationID directory with subject name information described in a leaf certificate;

FIG. 20 shows one example of the mapping information associating an AppID with information contained in the BD-J object;

FIG. 27 shows one example of the mapping information used to associate directories with information contained in metafiles;

FIG. 29 shows one example of the mapping information used to associate directories with metafile names.

REFERENCE NUMERALS

Figure 1:
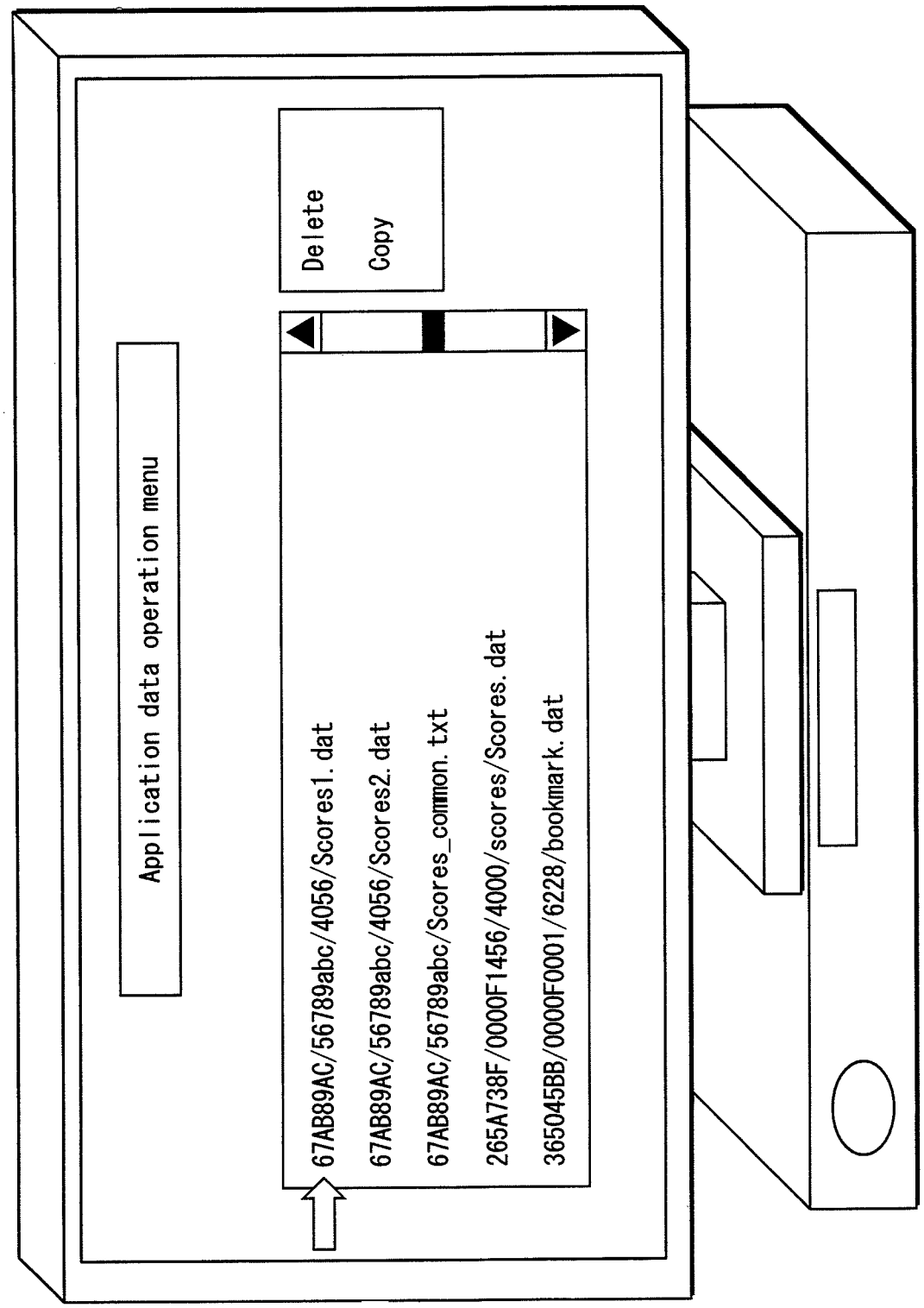
FIG. 1 shows a display example of information regarding data stored on a local storage, presented using directory names and file names.
Figure 2:
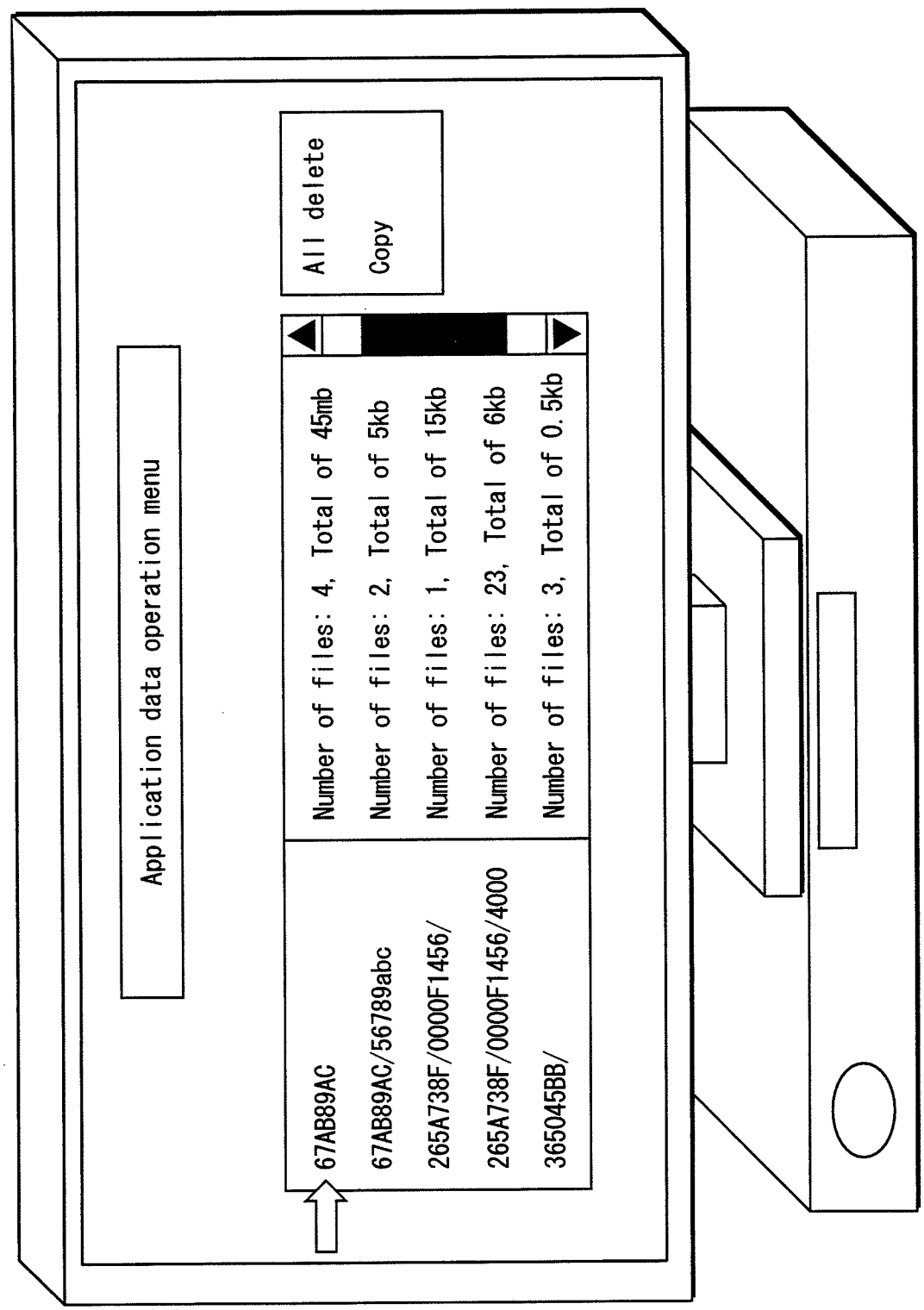
FIG. 2 shows a display example of information regarding data stored on a local storage, presented using directory names.

1 BD-ROM drive
2 Track buffer
3 Demultiplexer
4 Video decoder
5 Video plane
6 Audio decoder
7 Image memory
8 Graphics decoder
9 Graphics plane
10 Adder
11 Static scenario memory
12 Dynamic scenario memory
13 Control unit
14 HDMV module
15 BD-J module
16 Mode management module
17 Dispatcher
18 AV playback library
19 Mapping module
20 Local storage display module
21 UO detection module
22 Rendering engine
23 Network interface
24 Local storage
25 BD file system
30 Application
31 Media playback module
32 Application manager
33 Application authentication module
34 File I/O module
100 BD-ROM
200 Playback device
300 Remote controller
400 Television

BEST MODE FOR CARRYING OUT THE INVENTION

Embodiment 1

Figure 3:
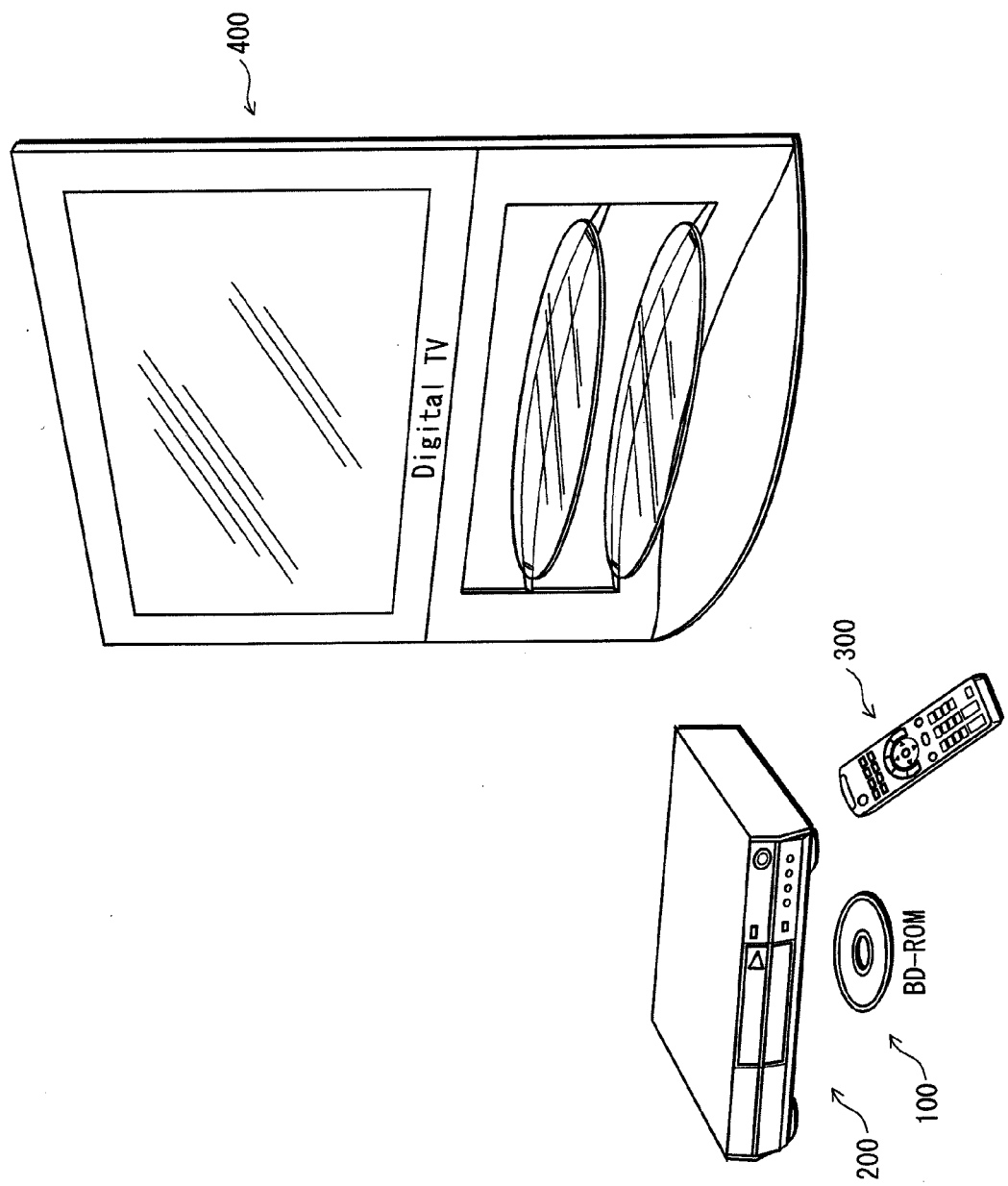
FIG. 3 shows a usage act of a data management device according to the present invention.

The following describes embodiments of a data management device according to the present invention. Firstly, of the implementation acts of the data management device according to the present invention, an embodiment of a usage act is described. FIG. 3 shows the usage act of the data management device according to the present invention. A playback device 200 shown in FIG. 3 is the data management device according to the present invention. The playback device 200 is used to supply movie works in a home theater system composed of a remote controller 300 and a television 400.

Figure 4:
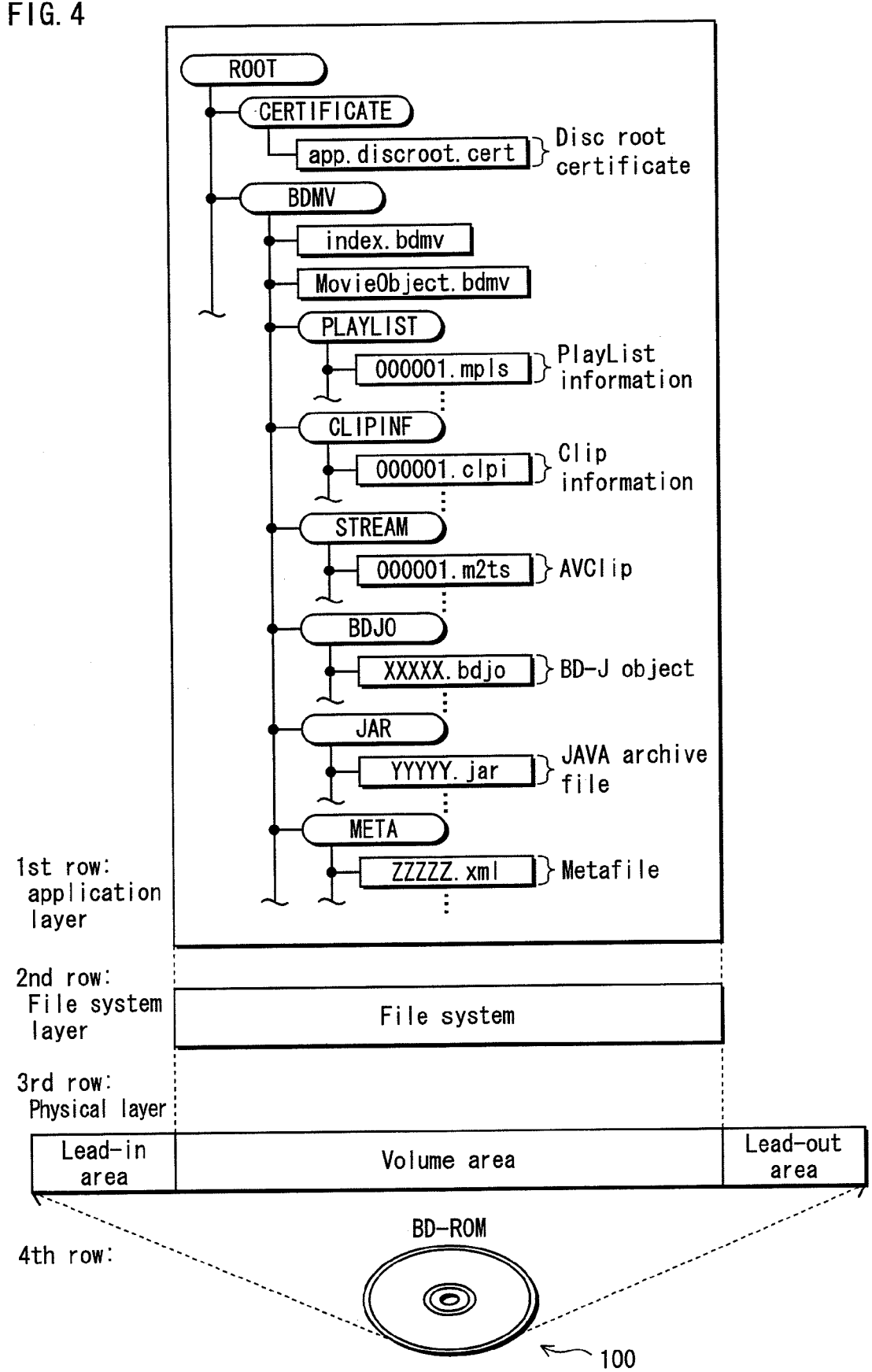
FIG. 4 shows the file and directory structure of a BD-ROM.

This concludes the description of the usage act of the data management device according to the present invention. The following now describes a recording medium that is a playback target of the playback device 200. The playback device 200 executes playback of a BD-ROM 100. FIG. 4 shows the internal structure of the BD-ROM 100.

In the figure, the fourth row shows the BD-ROM and the third row shows the track on the BD-ROM. The track is depicted in the state being laterally extended though it actually is spiraling from the inner circumference to the outer circumference of the BD-ROM. The track is composed of a lead-in area, a volume area, and a lead-out area. Inside the lead-in area is a special area called BCA (Burst Cutting Area). The BCA is permitted to be read only by the drive and not by any application, so that the BCA is often used for copyright protection technologies, for example.

The volume area has a layer model composed of a physical layer, a file system layer, and an application layer. The volume area stores file system information (volume) followed by application data, such as video data. The file system refers to a UDF or ISO9660, for example. In a manner similar to any conventional PC, logical data recorded on the BD-ROM can be read via the directory and file structure, and file names and directory names up to 255 characters are readable. The first row in the figure shows the application layer format (application format) depicted in the directory structure. As shown in the first row, the BD-ROM has a CERTIFICAE directory and a BDMV directory below the Root directory.

The CERTIFICAE directory has a file storing a root certificate of the disc (app.discroot.cert). The app.discroot.cert is a digital certificate used in a process of confirming that a Java application has not been tampered with and also confirming the identity of the application (hereinafter, this process is referred to as "signature verification"). The Java (registered trademark) application is executed by a Java virtual machine and provides dynamic scenario control. The signature verification is performed before execution of the Java application program.

The BDMV directory contains data such as AV contents and management information residing on the BD-ROM. The BDMV directory has six sub-directories, namely a PLAYLIST directory, a CLIPINF directory, a STREAM directory, a BDJO directory, a JAR directory, and a META directory. Two different types of files, namely INDEX.BDMV and MovieObject.bdmv are placed in the BDMV directory.

The STREAM directory contains one or more files that constitute the main data of digital streams. Each file contained in this directly has the extension "M2TS" (such as "000001.M2TS").

The PLAYLIST directory contains one or more files each having the extension "MPLS" (such as "000001.MPLS").

The CLIPINF directory contains one or more files each having the extension "CLPI" (such as "000001.CLPI").

The BDJO directory contains one or more files each having the extension "BDJO" (such as "XXXXX.BDJO").

The JAR directory contains one or more files each having the extension "JAR" (such as "YYYYY.JAR").

The META directory contains one or more XML files (such as "ZZZZZ.xml").

The following are description of those files.

<AV Clip>

Firstly, a file having the extension ".M2TS" is described. The file having the extension ".M2TS" stores a digital AV stream in an MPEG-TS (Transport Stream) format. Such a digital AV stream is obtained by multiplexing a plurality of streams including a video stream, at least one audio stream, a graphics stream, and a text subtitle stream. The video stream carries moving pictures of a movie and the audio stream carries audio of the movie.

<PlayList Information>

A file having the extension "MPLS" stores PlayList (PL) information. The PL information defines a playlist by referring to AV Clips.

<Clip Information>

A file having the extension "CLPI" stores Clip information, which is provided in one-to-one correspondence with an individual AV Clip. Being management information, the Clip information includes information indicating the coding format, frame rate, bit rate, and resolution of a stream of a corresponding AV Clip. The Clip information also includes an EP#map indicating the start address of each of a plurality of GOPs. The Clip information and PL information described above are classified into "static scenarios".

<BD-J Object>

Figure 5:
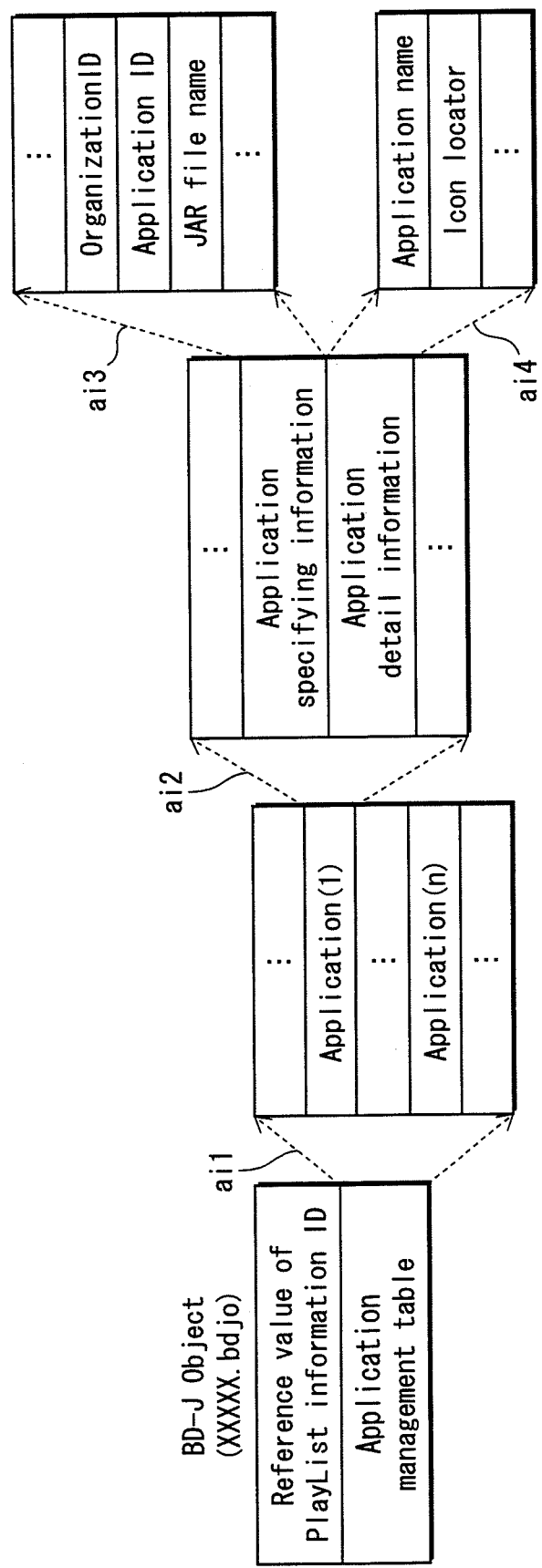
FIG. 5 shows the structure of a BD-J object.

The following now describes a file having the extension "BDJO". The file having the extension "BDJO" stores a BD-J object. The BD-J object is information defining a title, by associating an AV Clip sequence defined by PlayList information with one or more applications. FIG. 5 shows the internal structure of a BD-J object. As shown in the figure, the BD-J object indicates an "application management table" and a "reference value to PlayList information". The "reference value to PlayList information" indicates a specific piece of PlayList information to be played back concurrently at the start of this title. As indicated by a pair of dashed arrows ai1, the application management table is listing of information pieces specifying applications each having a life cycle bounded to this title. As indicated by a pair of dashed arrows ai2, each application is specified by a pair of application specifying information and application detail information. As the application specifying information, the identifier of the application creator (Organization ID), the identifier of the application (application ID), and the identifier of each Java archive file constituting the application are used. That is, one application is composed of one or more Java archive files.

In addition, as indicated by a pair of dashed arrows ai4, the application management table stores application detail information for each application. The application detail information includes a character string representing the name of a corresponding application and an icon locator specifying the storage location of an icon representing the application. The icon locator specifies the address of the icon contained in a Java archive file.

This concludes the description of the file having the extension "BOBJ".

The following now describes a "dynamic scenario". The term "dynamic" means that the playback control varies in response to a status change of the playback device 200 and a key event generated by a user. A BD-ROM may define such playback control with a description similar to a Java application. That is, a Java application on a BD-ROM plays a role of a dynamic scenario.

The following describes a Java application. A Java application is composed of one or more xlet programs loaded to the heap area (which may also be referred to as "work memory") of a virtual machine. The one or more xlet programs and data loaded to the work memory constitute the application. This concludes the description of the Java application structure.

The entity of a Java application is a Java archive file (YYYYY.jar) contained in the JAR directory located below the BDMV directory shown in FIG. 4. The following describes the Java archive file, with reference to FIG. 6.

<Java Archive File>

Figure 6:
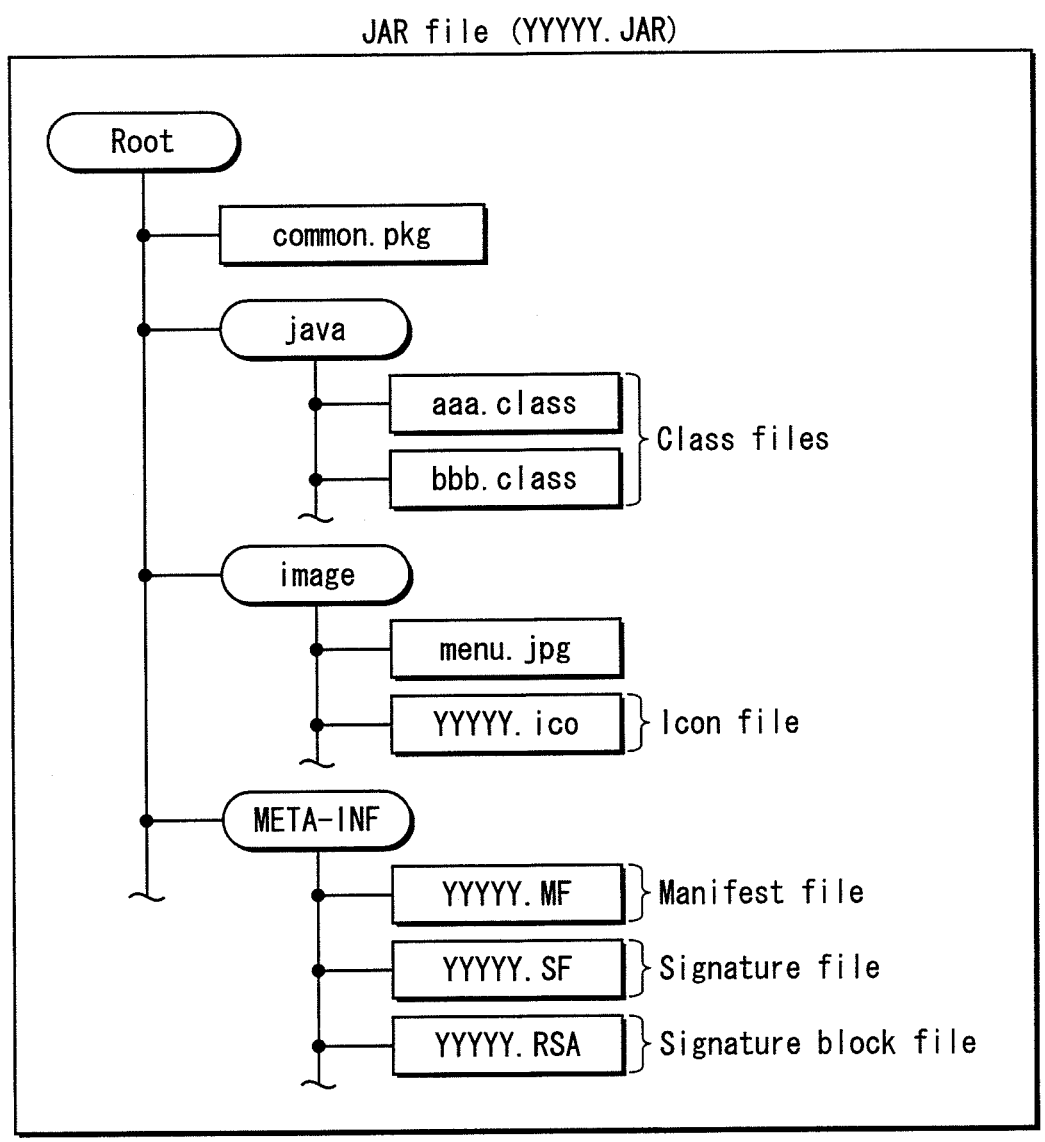
FIG. 6 shows programs and data contained in an archive file.

The Java archive file (YYYYY.JAR shown in FIG. 4) is a file obtained by combining one or more class files and one or more data files into one file. FIG. 6 shows programs and data contained in the archive file. The data shown in the figure is obtained as a result that a Java archiver combines a plurality of files organized in the directory structure enclosed within a box. The directory structure shown in the box includes the Root directory, the java directory, the image directory, and the META-INF directory. The Java archive file is obtained by combining those directories into one archive file by the Java archiver.

The Root directory contains a common.pkg file. The java directory contains class files (aaa.class and bbb.class). The image directory contains a menu.jpg file, a YYYYY.ICO file, and so on. The class files and data mentioned above are expanded when they are read into a cache from the BD-ROM. On the cache, the expanded data is treated as a plurality of files placed in the respective directories. The five-digit numeral "YYYYY" contained in the file name of the Java archive file represents the ID of the Java archive file. The BD-J object refers to a Java archive file by this numeral. When a Java archive file is read into the cache, the numeral contained in the file name of the Java archive file is referenced. In this way, programs and data constituting an arbitrary Java application are extracted.

In the figure, "YYYYY.ICO" denotes an icon file and is specified by the icon locator contained in a BD-J object with a relative address from the file name of the Java archive file, such as "YYYYY/image/YYYYY.ICO".

Each class file shown in the figure (aaa.class and bbb.class) is a class file corresponding to an xlet program described above. The playback procedure in the operating mode (the BD-J mode) provided in the Java operating environment is defined by the xlet program which is an instance of a class file. An xlet program is a Java program that can use an interface based on JMF (Java Media FrameWork) and execute PlayList playback in response to a key event according to a framework such as JMF.

Further, an xlet program is capable of causing a procedure for accessing a WWW site to download a content, which makes it possible to execute playback of an innovative work obtained by combining the download content with PlayList playback.

Further, the META-INF directory in the Java archive file contains a manifest file (YYYY.MF) indicating the structure of the corresponding application program and the digest values of individual files, a signature file (YYYY.MF), and a signature block file (YYYY.RSA).

The manifest file (YYYY.MF) stores the digest value of each file contained in the Java archive file. The signature block file (YYYY.RSA) contains the digital certificate and encrypted information. The encrypted information is generated by encrypting the digest value of the signature file itself, with a secret key paired with a public key indicated by the leaf certificate. The signature file and signature block file are used for the signature verification of the application.

Figure 7:
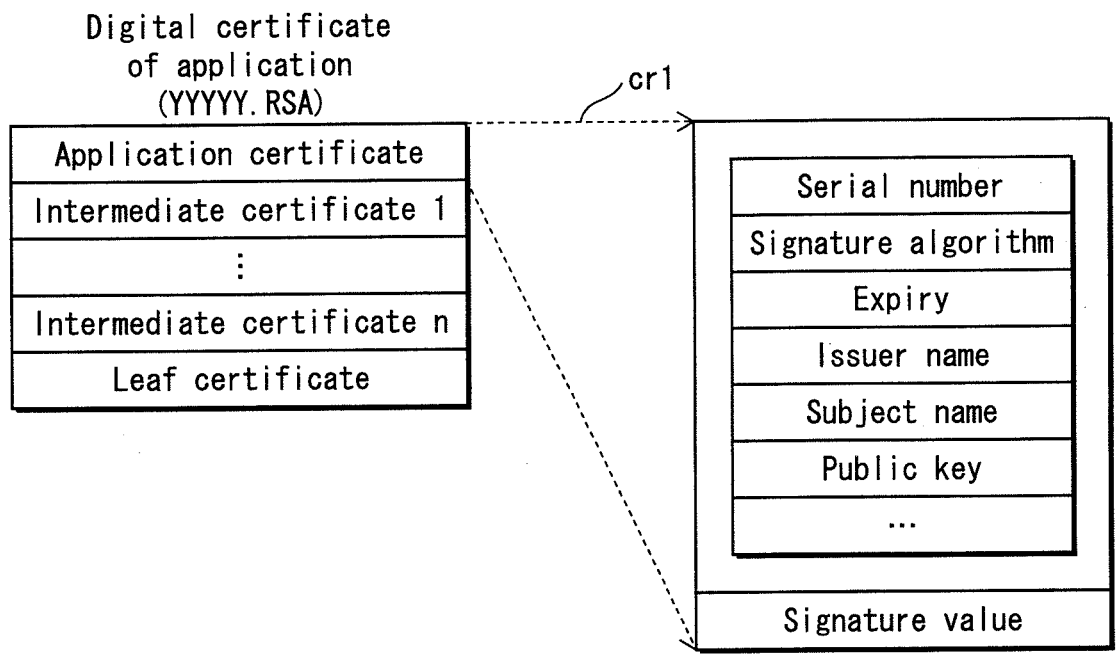
FIG. 7 shows the structure of a digital certificate for an application.

FIG. 7 is a diagram showing the structure of a digital certificate stored in the signature block file for the application. As shown in FIG. 7, the digital certificate is a chain composed of a plurality of certificates. The certificate chain is composed of certificates compliant with the X.509 standard. In the figure, a typical structure of a certificate chain composed of X.509 certificates is depicted. The certificate chain contains an application root certificate, intermediate certificates 1 . . . n, and a leaf certificate. The certificate are in chain relationship in which the owner of the application root certificate issues an intermediate certificate and the owner of the intermediate certificate issues a leaf certificate. In the case where there are a plurality of intermediate certificates, the respective intermediate certificates are also in chain relationship. X.509 certificates are widely used in the various fields related to the information and communication technology as the de facto standard of the certificate format.

The application root certificate is issued by a movie studio. Each intermediate certificate and the leaf certificate are issued by software venders belonging to the movie studio and signed by using a secret key corresponding to the application root certificate issued by the movie studio.

As indicated by a pair of dashed arrows cr1, each certificate is an X.509 certificate. In the figure, attributes that are necessary in the description of the present invention are selectively listed. The serial number is the number identifying the certificate. The signature algorithm indicates the algorithm used to compute the signature value. The expiry indicates the period during which this X.509 certificate is valid. The issuer name indicates an organization by which this X.509 certificate is issued. The subject name indicates the person or entity that owns this X.509 certificate. The public key is a public key belonging to the person or entity indicated by the named subject. The signature value is the value signed (encrypted) with the use of the secret key belonging to the issuer of this X.509 certificate.

Public key cryptography is a type of cryptography that employs a pair of a public key and a secret key and widely used in electronic commerce. According to the public key cryptography, two different keys are used for encryption of plaintext and decryption of the cipher text. Since different keys are used for encryption and decryption, even if the decryption key is publicly released, it is impossible to estimate the encryption key using the decryption key. This encryption key is a secret key and the decryption key is a public key. Typical examples of public key cryptography include RSA (Rivest-Shamir-Adleman) and DSA (Digital Signature Standard).

Figure 8:
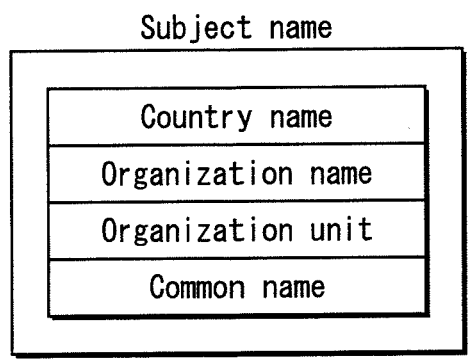
FIG. 8 shows the structure of a subject name described in an X.509 certificate.

FIG. 8 shows the details of the subject name shown in FIG. 7. The subject name is described in the X.509 identifier (Distinguished Name). The country name describes the country of the certificate owner, and the organization name indicates the name of the organization to which the certificate owner belongs. For example, the organization ID described in the application root certificate is the name of a studio, whereas the organization ID described in a leaf certificate is the name of a studio vender. The organization unit indicates a unit within the organization. The common name indicates an individual object. Although the common name may basically be arbitrarily described, it is usually described in a manner to suggest the contents of the certificate. Note that the subject name additionally includes other elements but the specification only mentions the elements that are necessary to describe the present invention.

In the case of the leaf certificate, the organization name includes at its end eight letters that expresses in the hexadecimal notation the 32-bit identifier (Organization ID) identifying the organization by which the application is created. This value is the same as the Organization ID used in the BD-J object. This concludes the description of the Java archive file.

The following describes INDEX.BDMV.

The INDEX.BDMV is management information of the overall BD-ROM and includes such information as an organization ID and a disc ID. The organization ID identifies the provider of the movie work, the disc ID is assigned uniquely to an individual BD-ROM provided by the provider. The INDEX.BDMV is the first file read by a playback device after the disc is inserted into the playback device, so that the disc is uniquely identified. In addition, the INDEX.BDMV contains a table that associates a plurality of titles available on the BD-ROM for playback and BD-J objects defining the individual titles.

The MovieObject.bdmv contains a scenario program in which a scenario is described. The scenario described therein is for dynamically changing the playback procedure during playback of a title in the HDMV mode.

<Metafile>

The metafile (ZZZZZ.xml) contained in the META directory stores various information related to the movie work recorded on the disc. Information stored in the metafile includes the disc name and image of the disc, information indicating the disc creator, and the names of the titles. The metafile is an optional file and some BD-ROMs are without any metafile.

This concludes the description of the BD-ROM 100.

Based on each file described above, the movie work recorded on the BD-ROM is subject to playback control by the playback device. FIG. 9 shows the layer model of the playback control. In FIG. 9, the first layer is a physical layer and controls supply of streams to be processed. As shown in the first layer, the streams to be processed may be supplied not only from the BD-ROM but also from various recording mediums and communication mediums, including a local storage, such as HDD (hard disk drive), built in playback device, a removable medium, and a network. That is, the first layer implements control to the supply sources such as the local storage, removable medium, and network (control of disc access, card access, and network communications).

The second layer is a layer of AV data. The second layer defines the decoding method for decrypting streams supplied in the first layer.

The third layer (BD management data) implements a static scenario of the stream. The static scenario refers to playback path information and stream management information defined in advance by the disc creator. The third layer defines the playback control based on the playback path information and stream management information.

The fourth layer (BD playback program) implements a dynamic scenario of a stream. The dynamic scenario refers to a program executing at least either of the playback procedure of an AV stream and the control procedure related to the playback. The playback control implemented based on a dynamic scenario changes in response to a user operation made to the device and thus is said to have a property like a program. There are two modes of dynamic playback control. One is a mode in which video date recorded on the BD-ROM is played back in a playback environment specific to audiovisual devices (HDMV mode). The other is a mode in which high value is added to video data recorded on the BD-ROM (the BD-J mode). On the fourth layer shown in FIG. 9, both the HDMV mode and the BD-J mode are described. The HDMV mode is a playback mode in a DVD-like playback environment and a scenario program runs in which a scenario is described for dynamically changes the playback proceeding. The BD-J mode is a playback mode in which a Java virtual machine is an entity and a Java application executes playback control.

FIG. 10 are views showing a movie work presented by dynamic playback control in the respective modes. FIG. 10A shows a scene of the movie created by defining dynamic playback control in the HDMV mode. The playback control in the HDMV mode is described with commands similar to those understandable to DVD players and it is therefore possible to define playback control in a manner similar to DVD's such that the playback proceeding changes in response to a selection made on a menu.

FIG. 10B shows a scene of the movie created by defining dynamic playback control in the BD-J mode. The control procedure in the BD-J mode is defined in a Java language understandable to a Java virtual machine. In the case where the playback control defines the behavior of computer graphics (CG) images, it is possible to present the video playback in the BD-J mode with CG animation (a picture of an animal in the figure) moving about next to the video playback screen.

The following now describes the details of the playback device 200 consistent with the present embodiment.

Figure 11:
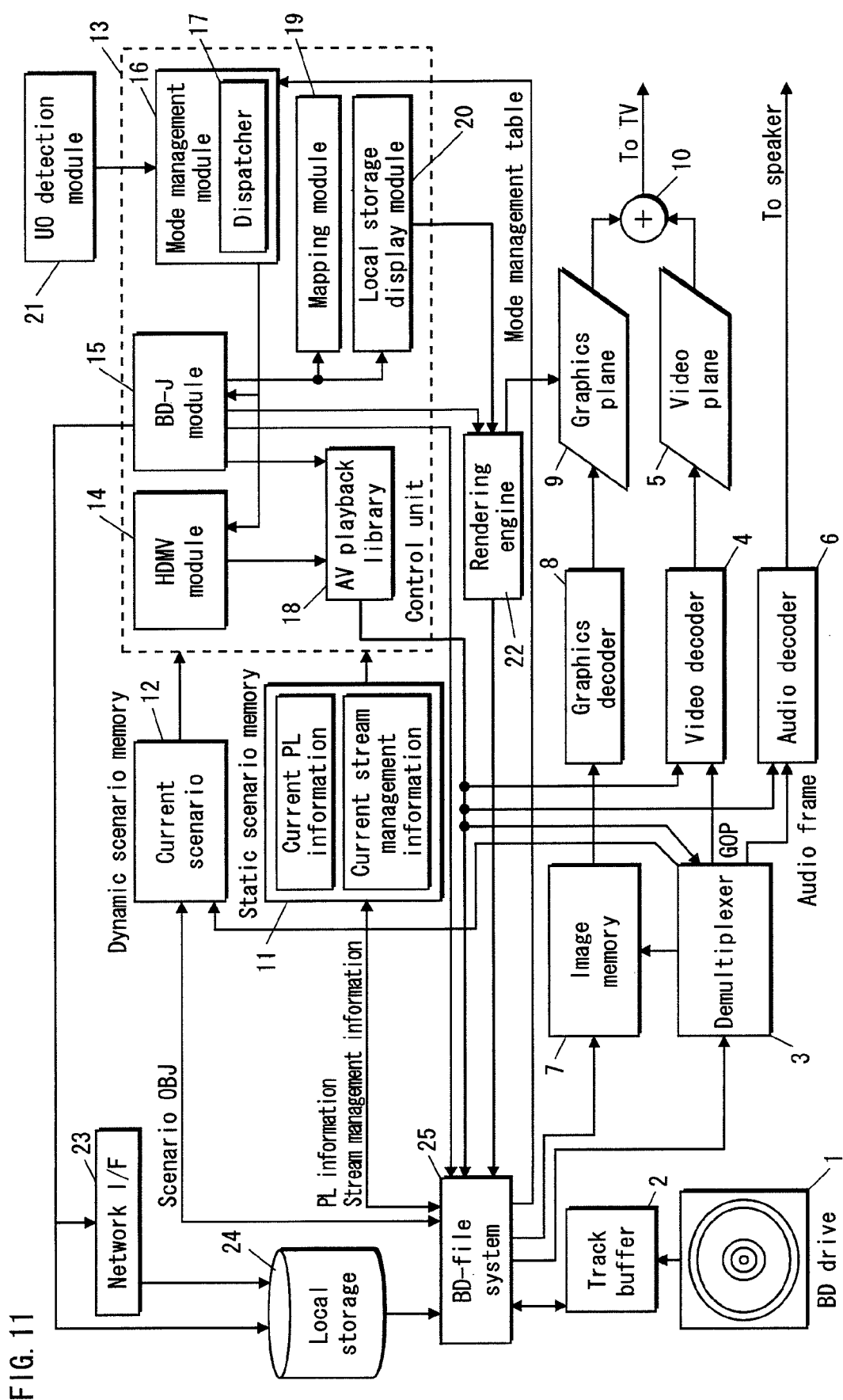
FIG. 11 a block diagram showing the internal structure of a playback device 100 consistent with an embodiment 1.

FIG. 11 is a block diagram showing the internal structure of the playback device. As shown in FIG. 11, the playback device includes a BD-ROM drive 1, a track buffer 2, a demultiplexer 3, a video decoder 4, a video plane 5, an audio decoder 6, an image memory 7, a graphics decoder 8, a graphics plane 9, an adder 10, a static scenario memory 11, a dynamic scenario memory 12, an HDMV module 14, a BD-J module 15, a UO detection module 21, a mode management module 16, a dispatcher 17, a rendering engine 22, an AV playback library 18, a network interface 23, a local storage 24, and a BD file system 25.

The BD-ROM drive 1 performs loading/ejecting of the BD-ROM into and from the playback device, and performs access to the BD-ROM.

The track buffer 2 is FIFO memory and stores ACCESS UNITs read from the BD-ROM in the order they are read.

The demultiplexer 3 demultiplexes a transport stream stored on the BD-ROM loaded in the BD-ROM drive 1 or on the local storage 24 to obtain audio frames and video frames constituting GOPs. Then, the video frames are output to the video decoder 4, whereas the audio frames are output to the audio decoder 6. Graphics streams are stored in the image memory 7. Navigation Button information is stored in the dynamic scenario memory 12. The demultiplexing by the demultiplexer 3 involves the conversion process in which TS packets are converted into PES packets.

The video decoder 4 decodes video frames output from the demultiplexer 3 and writes resultant uncompressed picture data to the video plane 5.

The video plane 5 is memory for storing uncompressed picture data.

The audio decoder 6 decodes audio frames output from the demultiplexer 3 and outputs resultant uncompressed audio data.

The image memory 7 is a buffer for storing graphics streams and PNG data contained in Navigation Button information supplied from the demultiplexer 3 and also for storing image files read from the BD-ROM or the local storage 24 via the BD file system 25.

The graphics decoder 8 decodes data such as a graphics stream stored on the image memory 7 and writes resultant data on the graphics plane 9. As a result of decoding the graphics stream, subtitles appear on a display screen.

On the graphics plane 9, a decoded graphics stream and images rendered by the rendering engine 22 are placed.

The adder 10 overlays uncompressed picture data stored on the video plane 5 with images expanded on the graphics plane 9 to output a composite image. The screen shown in FIG. 10B (a screen in which a CG image (an picture of an animal) is moving about next to the video playback) is output as a result that the adder 10 combines images on the graphics plane 9 with the pictures on the video plane 5.

The static scenario memory 11 is a memory for storing a current PL and current stream management information. The current PL refers to a PL that is currently processed, out of a plurality of PLs stored on the BD-ROM or the local storage 24. Similarly, the current stream management information refers to a specific piece of stream management information that is currently processed, out of a plurality of pieces of stream management information stored on the BD-ROM or the local storage 24.

The dynamic scenario memory 12 is memory for storing a current dynamic scenario and is used in processes by the HDMV module 14 and the BD-J module 15. Note that the current dynamic scenario refers to a scenario currently processed, out of a plurality of scenarios stored on the BD-ROM or the local storage 24.

A control unit 13 is a microcomputer system composed of ROM, RAM and CPU. The ROM stores a program for controlling the playback device. The program is read from the ROM into the CPU and cooperates with hardware resources to realize the functionalities of the HDMV module 14, the BD-J module 15, the mode management module 16, the dispatcher 17, the AV playback library 18, a mapping module 19, and a local storage display module 20.

The HDMV module 14 is a DVD virtual player acting as the execution entity in the HDMV mode and executes the current scenario program read to the dynamic scenario memory 12.

The BD-J module 15 is a Java platform and is composed of a Java virtual machine, configuration, and profile. The BD-J module 15 creates a current Java object from a Java class file read to the dynamic scenario memory 12 and executes the Java object. The Java virtual machine converts the Java object written in the Java language into native code of the CPU of the playback device and causes the CPU to execute the converted code.

The mode management module 16 holds a mode management table read from the BD-ROM or from the local storage 24 and carries out the mode management and brunching control. The mode management by the mode management module 16 involves a module allocation process for allocating the execution of a dynamic scenario to one of the HDMV module 14 and the BD-J module 15.

The dispatcher 17 selects UOs that are supported by the playback device and passes the selected UOs to a suitable module that executes the UOs. For example, if UOs for up, down, right, and left movement and for activation are received during the execution of the HDMV mode, the dispatcher 17 outputs the received UOs to the HDMV mode module.

The AV playback library 18 executes the AV playback function and the PlayList playback function in response to a function call from the HDMV module 14 and the BD-J module 15. The AV playback function refers to a group of functions adopted from DVD players and CD players and executes processes, such as playback start, playback stop, playback pause, pause release, release of the still image function, and fast fast-forward at the speed specified by an immediate value, rewind at the speed specified by an immediate value, audio switching, subtitle switching, and angle switching. The PlayList playback function refers to the execution of some of these AV playback functions according to the PlayList information.

The mapping module 19 realizes the function as the mapping unit for creating mapping information during execution of the signature verification process for an application. Based on information used for the signature verification, the mapping information associates the directory structure on the local storage 24 with text information that can be readily recognized by users.

The local storage display module 20 controls the process of presenting the data storage state of the local storage, by using the mapping information. Specifically, the local storage display module 20 causes the rendering engine to render an image to be output on a screen, based on the mapping information.

The UO detection module 21 detects a user operation made on the remote controller or the front panel of the playback device and outputs information indicating the detected user operation (such information is hereinafter simply referred to as "UO (User Operation)" to the mode management module 16.

The rendering engine 22 is provided with basic software, such as Java2D and OPEN-GL. The rendering engine 22 renders computer graphics according to instructions given from the BD-J module 15 and outputs the rendered computer graphics to the graphics plane 9.

The network interface 23 is used to download a BD-ROM additional content publicly available on the Internet. A BD-ROM additional content refers to a content that is not stored on the original BD-ROM and examples of additional contents include additional sub-audio, subtitles, bonus video, and applications. The network interface 23 can be controlled from the BD-J module 15 and is capable of downloading an additional content publicly available on the Internet to the local storage 24.

Figure 12:
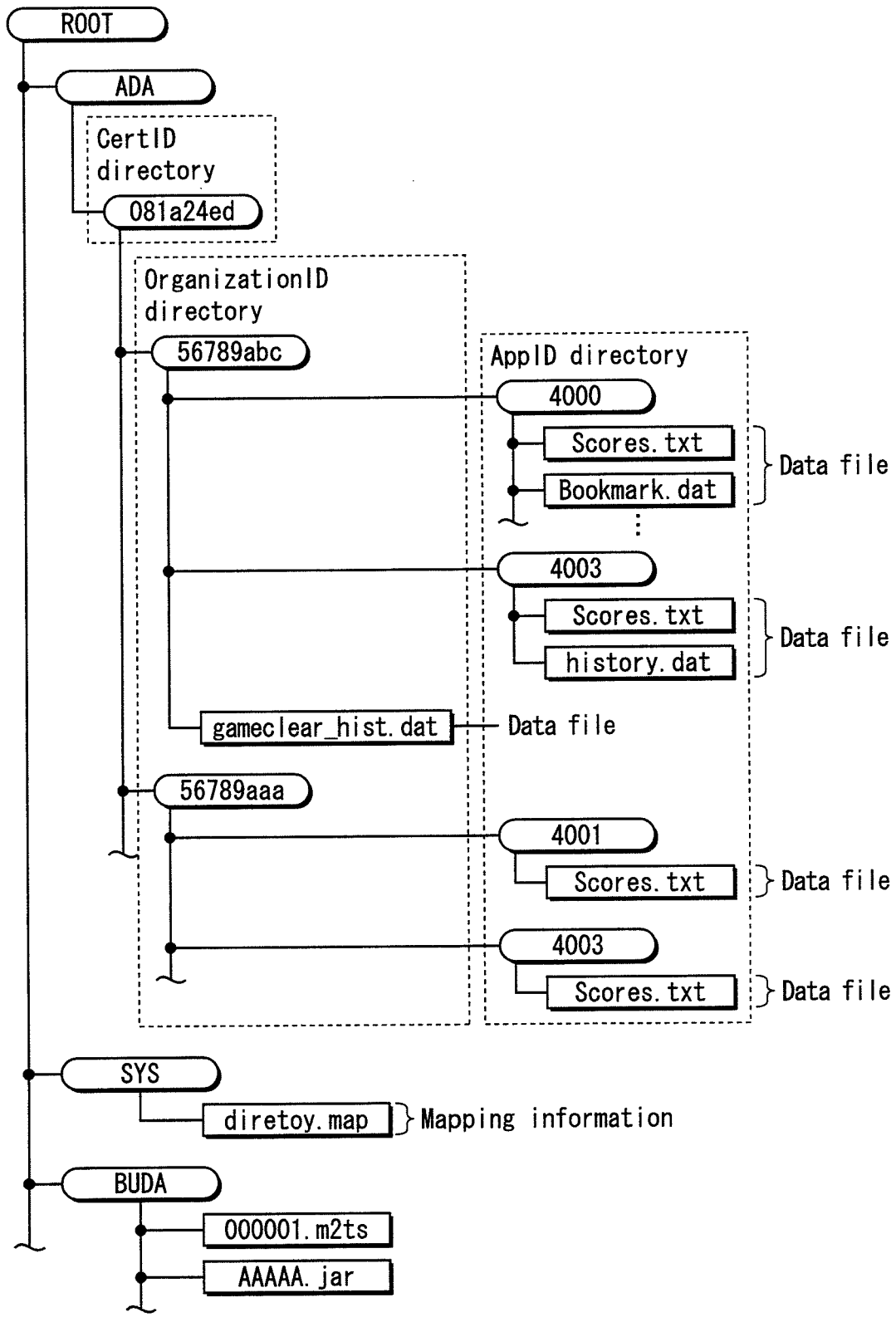
FIG. 12 shows the directory structure of a local storage 24.

The local storage 24 is a magnetic recorder such as a hard disk built in the playback device. FIG. 12 is a view showing the directory structure of the local storage 24. In the directory structure, an ADA directory, an SYS directory, and a BUDA directory are located below the Root directory. The ADA directory is for storing data that is used by applications and contains a plurality of directories each accessible by a different application. The SYS directory is for storing mapping information generated by the mapping module 19. The BUDA directory is for storing files used in creating a virtual package by the BD file system 25.

In the directory structure shown in the figure, the ADA directory is a restricted area. That is, access to the ADA directory is protected against access by any applications other than signed applications of which authenticity is verified. The ADA directory has a sub-directory called "CertID directory", which in turn has a sub-directory called "OganizationID directory", which in turn has a sub-directory called "AppID directory".

The CertID directory has, as its name, the ID derived from the disc root certificate (app.discroot.cert) on the BD-ROM. Specifically, the directory name is derived from the SHA-1 digest value of the disc root certificate.

The OrganizationID directory has a name composed of eight letters which are a hexadecimal notation for a 32-bit identifier (OrganizationID) described in the BD-J object stored on the BD-ROM to identify the organization that created the application.

The AppID directory has a name composed of four letters which are a hexadecimal notation for a 16-bit identifier (application ID) described in the BD-J object stored on the BD-ROM to identify the application. The application identifier holds a value up to 0x3FFF indicates that the application is an unsigned application (i.e., without a signature).

Each directory located below the OrganizationID directory and the AppID directory is accessible by an application having the ID that matches the application ID described in the BD-J object. That is, an application having the Organization ID "56789abc" and the application ID "4003" is permitted to access any data files contained in the AppID directory "4003", which is a sub-directory of the OrganizationID directory "56789abc" but prohibited from accessing any data files stored in the AppID directory "4003", which is a sub-directory of the OrganizationID directory "56789abd". However, the application is prohibited from accessing any data files contained in the AppID directory "4001", although the AppID directory "4001" is located below the OrganizationID directory "56789abc".

Further, access to data files stored on the local storage is not permitted to every application but restricted specifically to trusted applications. Specifically, a trusted application refers to an application signed with the secret key of the content provider (hereinafter, such an application is referred to as a signed application).

Access to the local storage by a signed application is permitted only after the authenticity of the signed application is successfully verified with the use of the public key corresponding to the secret key (signature verification is successful). The public key is contained in the application in the form of a certificate compliant with the X.509 standard. The details of X.509 are described in CCITT Recommendation X.509 (1988), "The Directory—Authentication Framework" published by CCITT. The signature verification for an application fails, if the Organization ID described in the BD-J object stored on the BD-ROM does not match the Organization ID shown at the end of the organization name described in the leaf certificate.

The BD file system 25 merges data read from the BD-ROM with data stored in the directories below the BUDA directory in the local storage 24 to create a virtual package and provides the virtual package to the other functional blocks of the playback device.

This concludes the description of the internal structure of the playback device.

According to the present embodiment, the directory structure of the local storage 24 shown in FIG. 8 is displayed in association with the subject name shown in FIG. 8, which allows the user to readily understand what data is targeted for a user operation. The display as described above is realized by the following two major processes. One is a process of generating and storing mapping information into the local storage 24, and the other is a process of displaying operation target data on a screen, by using the mapping information. The following describes the details of the BD-J module that controls the two processes.

Figure 13:
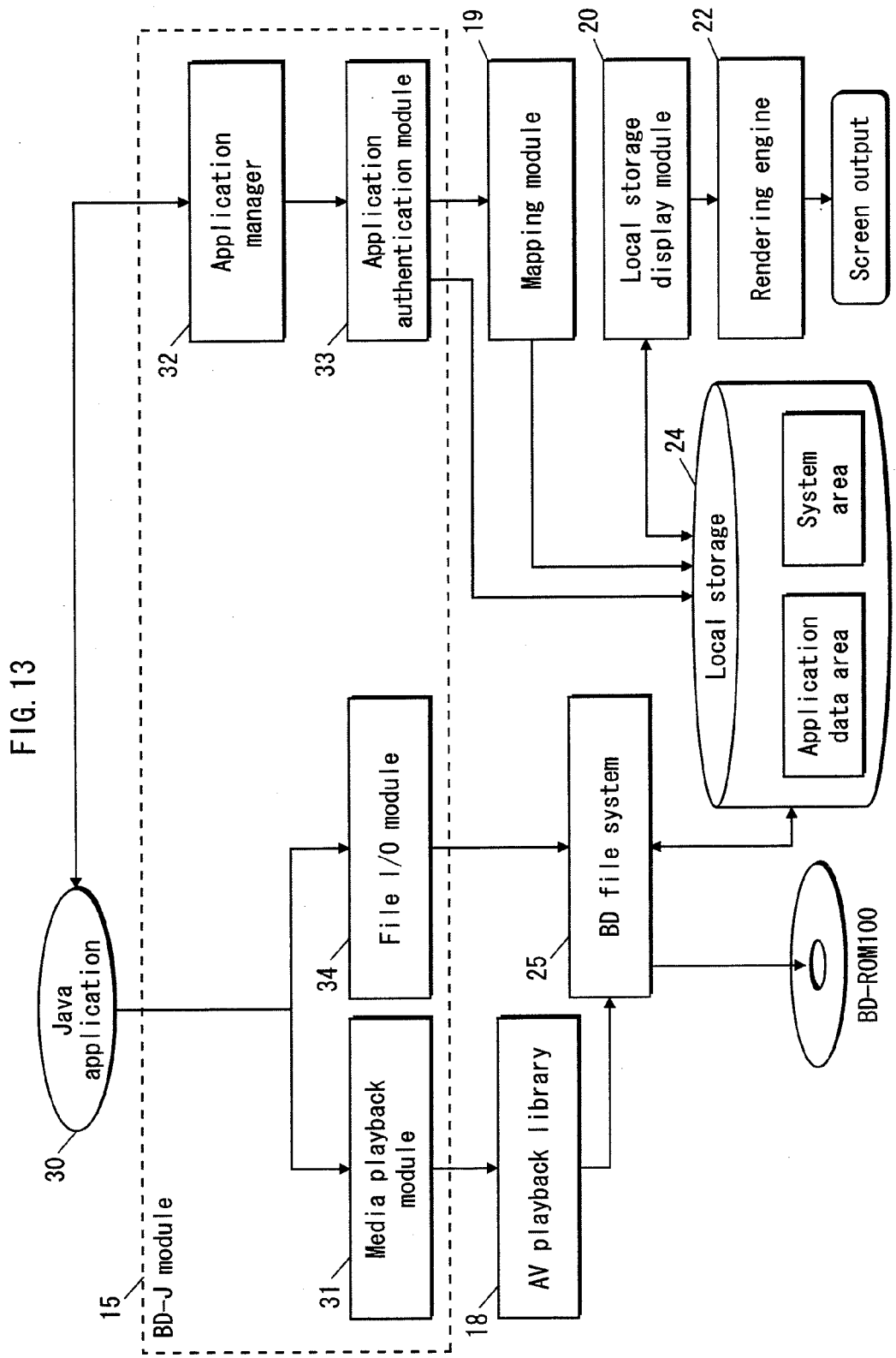
FIG. 13 shows the detailed structure of a BD-J module according to the embodiment 1 and the structure of related modules.

FIG. 13 shows the specific structure of the BD-J module shown in FIG. 11. The BD-J module 15 includes a media playback module 31, an application manager 32, an application authentication module 33, and a file I/O module 34.

The media playback module 31 provides APIs for implementing media playback control to a Java application 30. When the Java application 30 calls a media playback control API, the media playback module calls the functions corresponding to the called API from the AV playback library 18 and executes AV playback control.

The application manager 32 manages activation and termination of Java applications according to the application management table of the BD-J object shown in FIG. 5 and recorded on the BD-ROM. In addition, the application manager 32 passes a UO event received from the dispatcher 17 to the Java application 30 that is currently running.

The application authentication module 33 acts as the verification unit and executes a signature verification process of the application program.

Specifically, the application authentication module 33 judges whether or not an application activated by the application manager 32 is a signed application. On judging that the application is a signed application, the application authentication module 33 executes a process of application authentication with the use of a digital certificate, a signature file, and a signature block file all contained in the application.

The file I/O module 34 processes a request for access to the local storage issued by the Java application 30. The Java application 30 is capable of placing contents data at appropriate locations on the local storage with the use of the file I/O module. In addition, the Java application 30 is also capable of deleting data that is no longer necessary and of directly editing data.

The following describes the details of a mapping process of generating mapping information and storing the mapping information to the local storage 24. According to this embodiment, the mapping process is executed at the time of the signature verification process that is executed when an application is activated.

Figure 14:
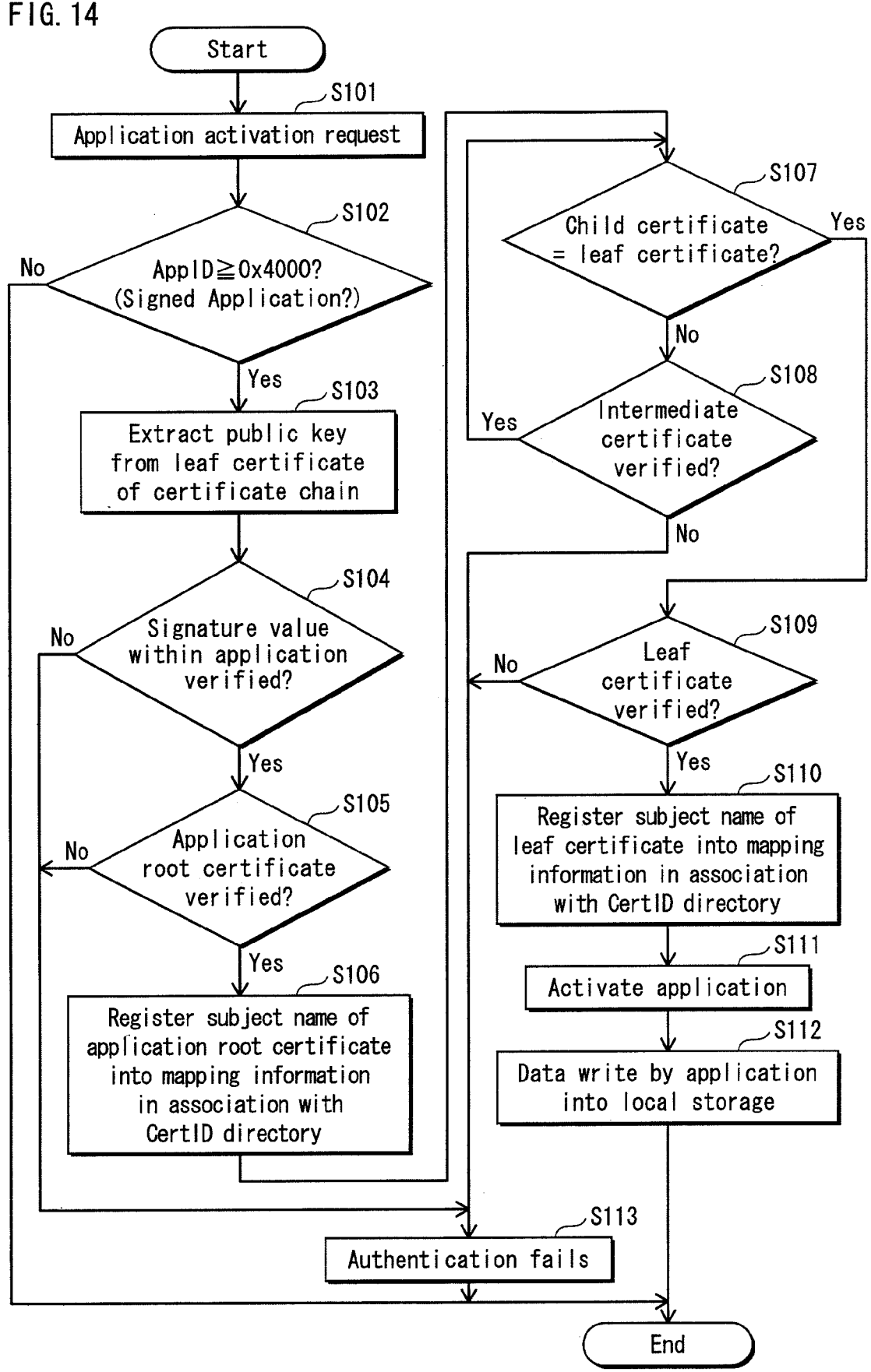
FIG. 14 is a flowchart showing the application activation involving a mapping process according to the embodiment 1.

FIG. 14 is a flowchart showing the flow of the application activation process involving the mapping process according to the embodiment 1. First, a BD-J mode tile is played back and the application manager issues a Java application activation request to the application authentication module (S101). The application activation request contains an application ID and an organization ID both identifying the application requested to be activated. The application ID and the organization ID are acquired from the application management information. Upon receipt of the application activation request, the application authentication module 33 judges, based on the received application ID, whether or not the requested application is signed (S102). When the application ID takes a value falling within the range of 0x000 to 0x3fff, it is then judged that the application is not a signed application. On the other hand, if the application ID takes a value falling within the range of 0x4000 to 0x7fff, it is then judged that the application is a signed application.

If the application authentication module 33 judges in Step S102 that the application is not a signed application, the application is activated without having to go through the application authentication. Yet, no application is permitted to access the local storage unless it is verified through the application authentication.

If the application authentication module 33 judges in Steps S102 that the application is a signed application, the application authentication process is performed. Through the application authentication process, the authenticity of the application (i.e., the program has not been tampered with) is verified and also the identity of the application is verified. For example, a signed application may be in the "Signed Jar" format defined by Sun Microsystems, Inc. A signed application contains a Manifest file storing digests of individual files of the application and also contains a Signature file (signature file). A signed Jar file contains, in addition to the two files mentioned above, a Signature Block file (signature block file) storing such information in the PKCS #7 format as the signature for the Signature file and a certificate chain verifying the signature.

In the application authentication process described above, the application authentication module 33 extracts a public key from the leaf certificate in the certificate chain stored in the Signature Block file of the application (S103), and verifies the signature value that is acquired directly from the application and contained in the Signature Block file (S104). If the verification fails, it means that the application is not authentic and thus the application is not activated (S113). If the verification is successful, it means that the application has not been tampered with.

Next, in order to verify the identity of the application, the certificate chain needs to be verified. The application authentication module 33 extracts the application root certificate from the certificate chain stored in the Signature Block file and performs the verification (S105). Specifically, the verification of an application root certificate involves a process of confirming that the application root certificate has not been expired with reference to the validity period described in the application root certificate and a process of confirming that the application root certificate is identical to the disc root certificate placed in the CERTIFICATE directory on the disc. If the verification of the application root certificate fails (S105: No), it is judged that the application is not authentic and thus the application is not activated (S103).

If the verification of the application root certificate is successful (S105: Yes), the mapping module 19 is informed of the successful verification. In response, the mapping module 19 registers an additional entry into the mapping information, such that information contained in the subject name described in the application root certificate is associated with the CertID directory name that is computed from the disc root certificate (S106).

If the CertID directory name computed from the disc root certificate is already registered in the mapping information, Step S106 may be skipped. In addition, if the playback device configured not to use the CertID directory to store application data, Step S106 may be omitted.

FIG. 15 shows one example of the mapping information in the state upon completion of Step S106. As shown in FIG. 15, the CertID shown on the left is associated with the organization name shown on the right that is extracted from the subject name. Although the organization name is used in the example shown in FIG. 15, any other information item shown in FIG. 8 may be used instead of the organization name.

The application authentication module 33 extracts, from the same certificate chain, a child certificate that is immediately subordinate and judges whether or not the thus extracted child certificate is a leaf certificate (S107). The judgment as to whether a specific certificate is a leaf certificate or not is made based on whether the issuer name and the serial number indicated by the PKCS #7 information contained in the Signature Block file match the subject name and the serial number described in the extracted certificate, respectively.

If the certificate extracted in Step S107 is not a leaf certificate, a process of verifying the intermediate certificate is performed (S108). Specifically, the process of intermediate certificate verification involves the following two processes. One is a process of confirming that the intermediate certificate has not been expired with reference to the validity period described in the intermediate certificate. The other is a process of checking whether the signature value contained in the intermediate certificate is correct, by using a public key contained in a parent certificate of the intermediate certificate. If the intermediate certificate verification in Step S108 fails (S108: No), it is judged that the application is not authentic and thus the application is not activated (S113). If the intermediate certificate verification in Step S108 is successful, the processing goes back to Step S107 to further judge whether or not the next certificate immediately below the current certificate is a leaf certificate.

In the certificate extracted in Step S107 is a leaf certificate (S107: Yes), a process of verifying the leaf certificate is performed (S109). Specifically, the leaf certificate verification process involves the following three processes. One is a process of confirming that the leaf certificate has not been expired with reference to the validity period described in the leaf certificate. Another is a process of checking whether the signature value contained in the leaf certificate is correct, by using a public key contained in a certificate having the same subject name as the issuer name. The other is a process of checking whether the Organization ID contained in the organization name included in the subject name described in the leaf certificate is identical to the Organization ID received from the application manager in Step S101. If the leaf certificate verification in Step S109 fails (S109: No), it is judged that the application is not authentic and thus the application is not activated (S113).

If the leaf certificate verification is successful in Step S109 (S109: Yes), the mapping module 19 is informed of the successful verification. In response, the mapping module 19 registers an additional entry into the mapping information, such that information contained in the subject name described in the leaf certificate is associated with the Organization ID received from the application manager in Step S101 (S110). The mapping information is stored based on the information of the CertIDs registered in Step S106. That is, even if the same Organization ID is already registered in the mapping information, the Organization ID is additionally registered into the mapping information as long as the CertID is different.

FIG. 16 shows one example of the mapping information in the state upon completion of Step S110. As shown in FIG. 16, the mapping information associates the CertID, the subject name described in the application root certificate, the Organization ID, and the subject name described in the leaf certificate. Although the organization name is used as the subject name of the leaf certificate in the example shown in FIG. 16, any other information item shown in FIG. 8 may be used instead of the organization name. In addition, as shown in FIG. 16, the same pair of the CertID and the subject name described in the application root certificate may be associated with a plurality of pairs of Organization IDs and subject names described in leaf certificates. As shown in FIG. 16, although the Organization ID ("56789abc" in the example shown in FIG. 16) is the same, different entries are made to the mapping information as long as the CertIDs are different.

The application authentication process completes upon completion of Step S110. Upon completion of the application authentication process, the application authentication module 33 informs the application manager 32 that that the application authentication was successfully established. In response, the application manager 32 activates the application according to the activation request issued in Step S101 (S111).

The activated application is permitted to read and write data into areas located below the directory corresponding to the IDs described in the BD-J object residing in the ADA area on the local storage 24 (S112). This concludes the details of the mapping process.

According to the present embodiment, the application authentication is carried out by verifying the application root certificate, the intermediate certificate, and the leaf certificate in the stated order. However, this order may be altered.

Figure 17:
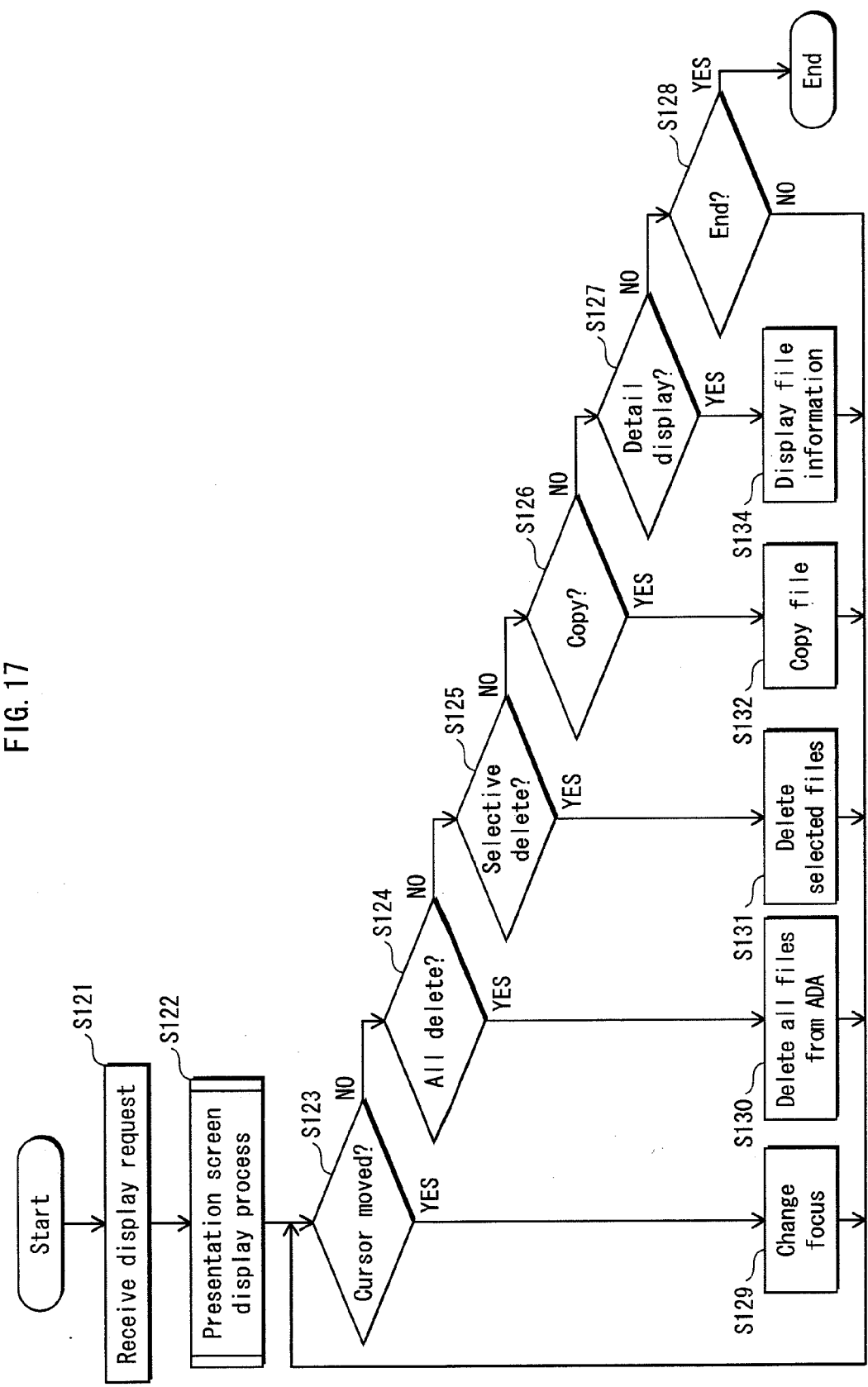
FIG. 17 is a flowchart showing a management process of data stored in an ADA area.

Next, the following describes a process of presenting a display screen to the users, with the use of mapping information. The display screen shows data that is selectable as targets to be processed. According to this embodiment, the process of presenting the display screen is performed through a series of processes for managing data stored in the ADA area. FIG. 17 is a flowchart showing the management processes of data stored in the ADA area.

Figure 19:
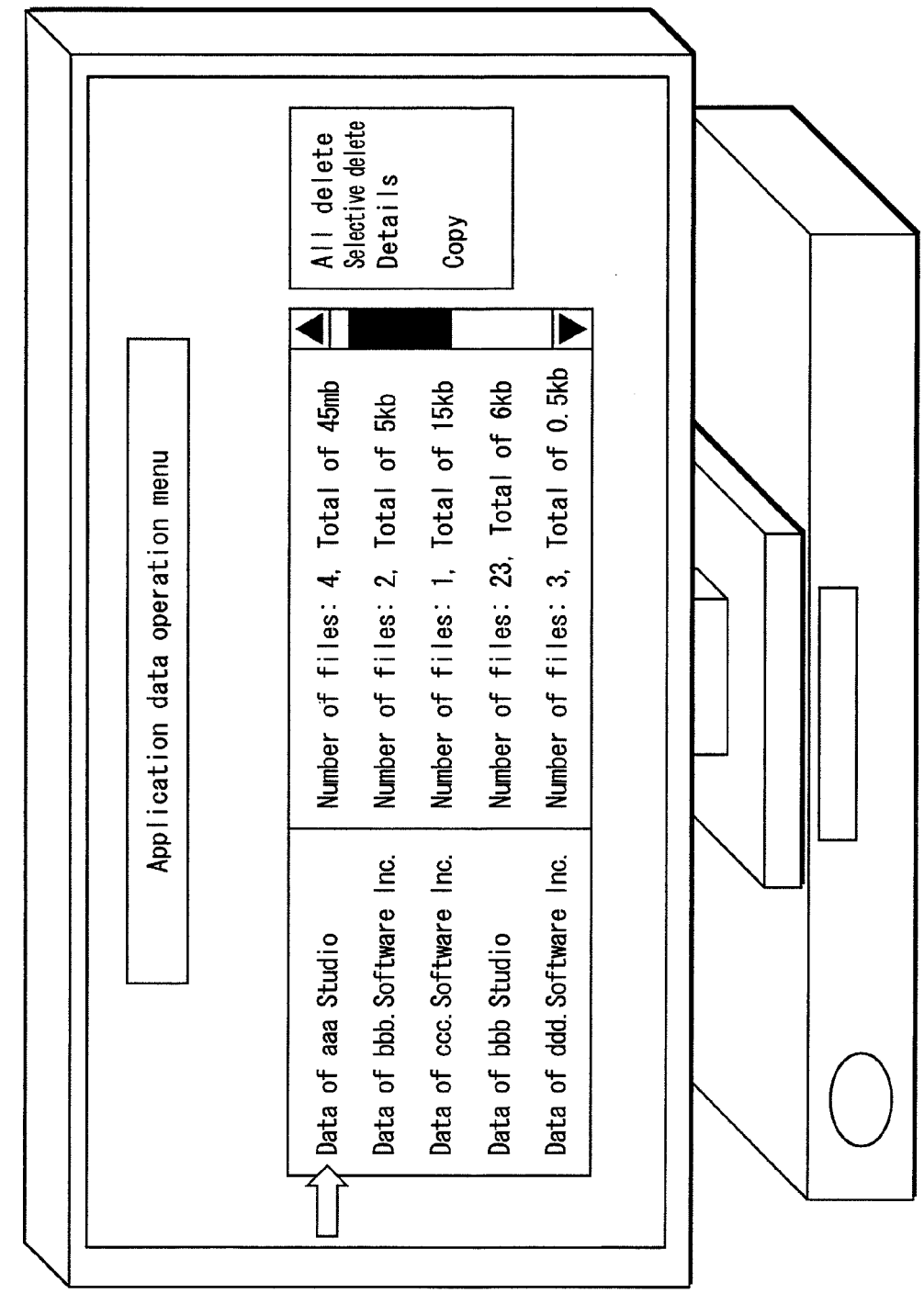
FIG. 19 shows an example of a display screen presented by using the mapping information according to the embodiment 1.

When a UO requesting to start the data management is received from an input device, such as the remote controller (S121), the file I/O module 34 instructs the local storage display module 20 to execute the processing of presenting the display screen (S122). As a result of the display screen presentation process, a display screen as shown in FIG. 19 is presented on the television 400, which allows the user to make appropriate operations by viewing the display screen.

In response to such a UO, the file I/O module 34 judges the contents of the UO by performing the series of steps from S123 to S128 and executes an appropriate process such as the following, by performing the series of steps from S129 to S134. Examples of the processes include moving of the focus presented on the screen, deletion of all the data files stored in the ADA area, deletion of a data file currently being focused, copying of the data file currently being focused, and displaying of more detailed information about the data file currently being focused.

Note that the detailed information of a data file may include the file size, the date and time of the file creation, and the date and time of the file update.

Figure 18:
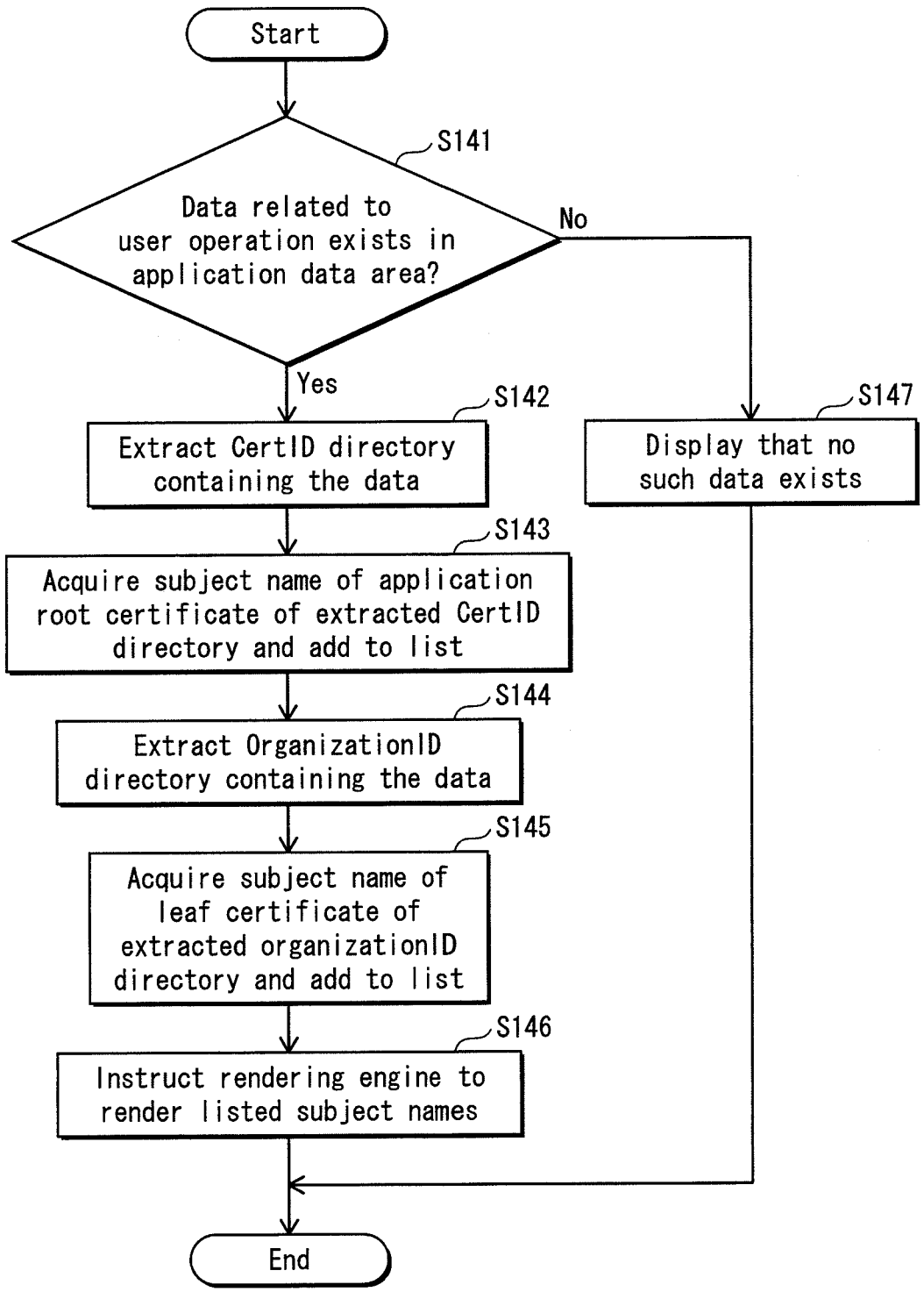
FIG. 18 is a flowchart showing the details of a display screen presentation process performed with the use of the mapping information to display the state of data stored in the ADA area.

FIG. 18 is a flowchart showing the details of the display screen presentation process performed with the use of the mapping information to display information regarding the stored data.

On receiving an instruction to execute the display screen presentation process from the file I/O module 34, the local storage display module 20 checks if data selectable as a user operation target is stored in the ADA area (S141).

If no data selectable as a user operation target exists in the ADA area (S141: No), the local storage display module 20 causes the rendering engine 22 to render an image to be output on the screen to indicate that no data selectable as a user operation target is found in the ADA area (S147).

If data selectable as a user operation target exists in the ADA area (S141: Yes), the local storage display module 20 extracts the CertID directory storing the data (S142) and creates a list in a work area of RAM, with a set of data entries including the number of files located below the extracted CertID directory, the total size of the files, and the subject name of the application root certificate associated with the extracted CertID according to the mapping information (S143).

Next, the local storage display module 20 extracts the OrganizationID directory storing the data (S144), adds to the list crated in Step S142, a set of new entries including the number of files located below the extracted OrganizationID directory, the total size of the files, and the subject name of the application leaf certificate associated with the extracted CertID according to the mapping information (S145).

Then, the local storage display module 20 causes the rendering engine 22 to render an image to present the information temporarily stored in RAM in the list format (S146).

Through the above steps, the display screen as shown in FIG. 19 is presented based on the information about the organizations that created the targeted data files. This display screen provides the user with information about the target data files in a manner that is readily understandable.

As described above, the playback device according to the present invention allows users to make operations by displaying the organization name in expression that is understandable to the users, rather than by simply displaying the directory names in expression that appears meaningless to the users. This allows the user to more easily determine the contents or details of the target data.

According to the present embodiment, the CertID directory and the OrganizationID directory are associated with information items of the subject name described in the digital certificate. Alternatively, however the AppID directory in the ADA area may additionally be associated with information that is readily understandable to the users, so that more detailed information may be presented.

The mapping process for the AppID directory may be performed at any time after the playback device 200 is activated. Yet, it is especially preferable to perform the mapping process in the signature verification process that is performed upon activation of an application as shown in FIG. 14. It is because the application at that time has no execution history and thus there is no undesirable possibility that unnecessary information is registered into the mapping information or that necessary information regarding a related data file is not registered into the mapping information.

Further, there is an additional reason why it is also desirable to execute the mapping process for the AppID directory in the signature verification process that is performed upon activation of an application. That is, with such timing, the application ID contained in an application activation request received from the application manager 32 is available for reference, so that it is easy to retrieve appropriate information from the application management table contained in the BD-J object.

Among information items contained in the application management table of a BD-J object, the application name and icon locator shown with the pair of dashed arrows ai4 in FIG. 5 are especially suitable as information to be associated with the AppID directory. FIG. 20 shows one example of the mapping information associating the AppID with such information items. The mapping information shown in FIG. 20 associates the CertID with Organization ID and also with a corresponding application name and an icon image as information relating to the AppID. The application name is acquired from the application management table and the icon image is specified by a corresponding icon locator specified by the application management table.

Figure 21:
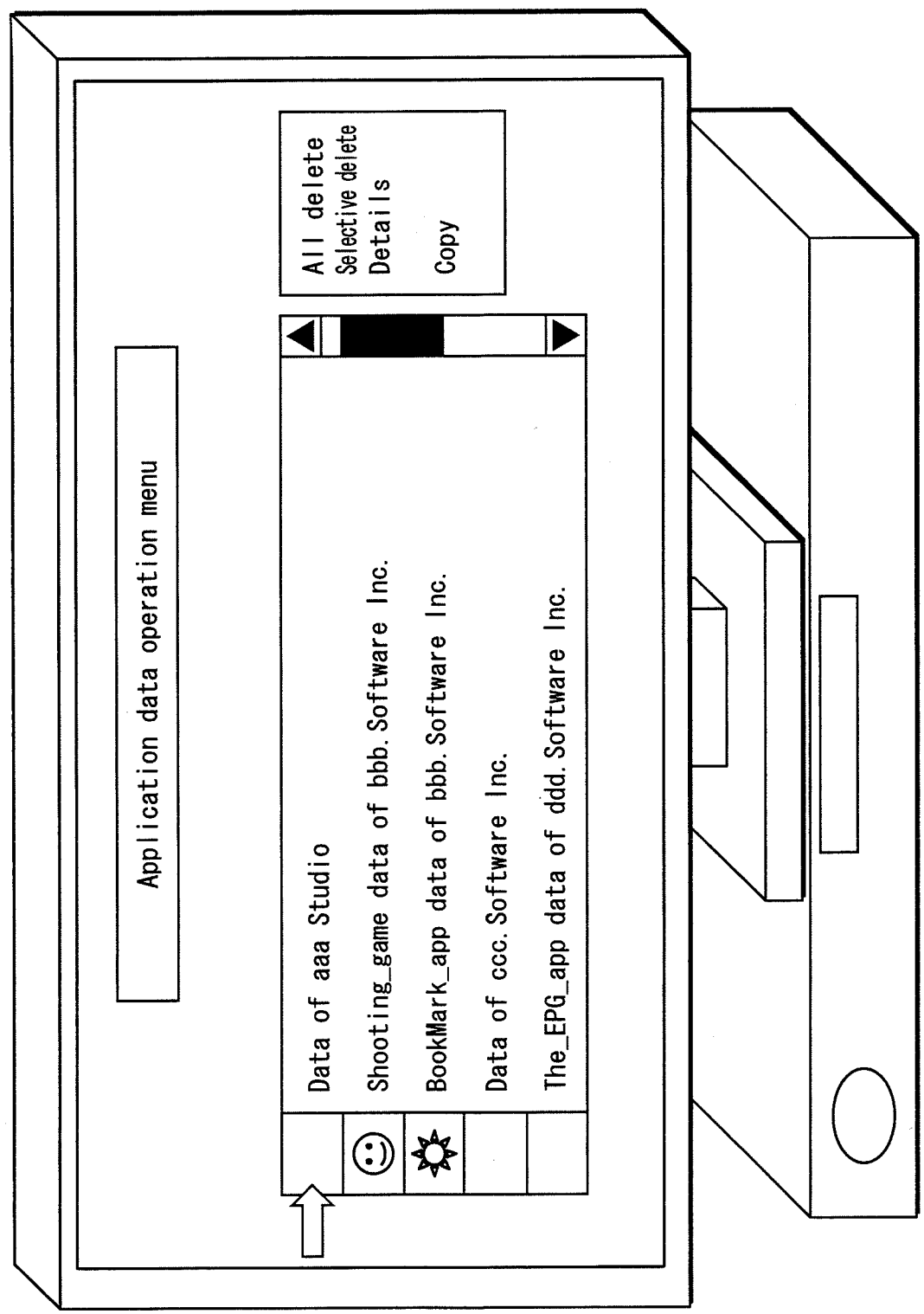
FIG. 21 is an example of a display screen presented by using the mapping information associating the AppID directory with appropriate information.

In addition, the local storage display module 20 may be configured to operate in the following manner at the time when the AppID directory is registered into the mapping information in the display screen presentation process. That is, after Step S145 shown in FIG. 17, the local storage display module 20 extracts the AppID directory storing the target data and adds to the display list a set of entries including the number of files located below the extracted AppID directory, and the total size of the files, and information associated with the extracted CertID according to the mapping information. FIG. 21 is an example of the display screen created with the use of the mapping information shown in FIG. 20. Since the information about AppID is associated, the user can determine the details and contents of the target data even more easily.

According this embodiment, the CertID directory and the OrganizationID directory are associated with information relating to the subject name described in the digital certificate that is stored in a Java archive file containing a signed application. Yet, as shown in FIG. 8, the digital certificate contains a plurality of pieces of text information related to the subject name. The present invention may be embodied with a configuration that allows a user to select any of the plurality of pieces of text information relating to the subject name and associates the CertID directory and the OrganizationID directory with the thus selected piece of text information.

Figure 22:
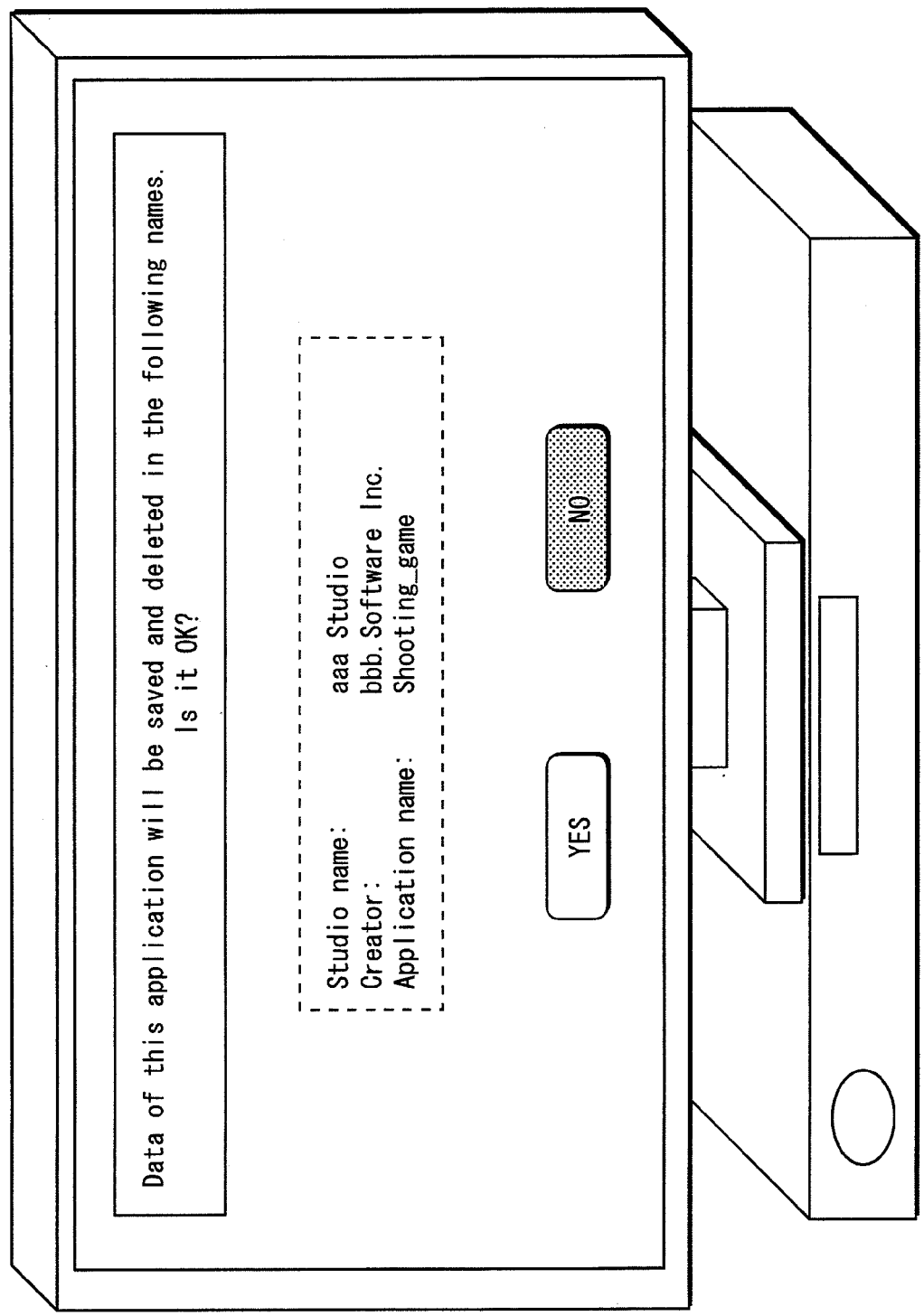
FIG. 22 shows one example of a display screen for entering user confirmation.
Figure 23:
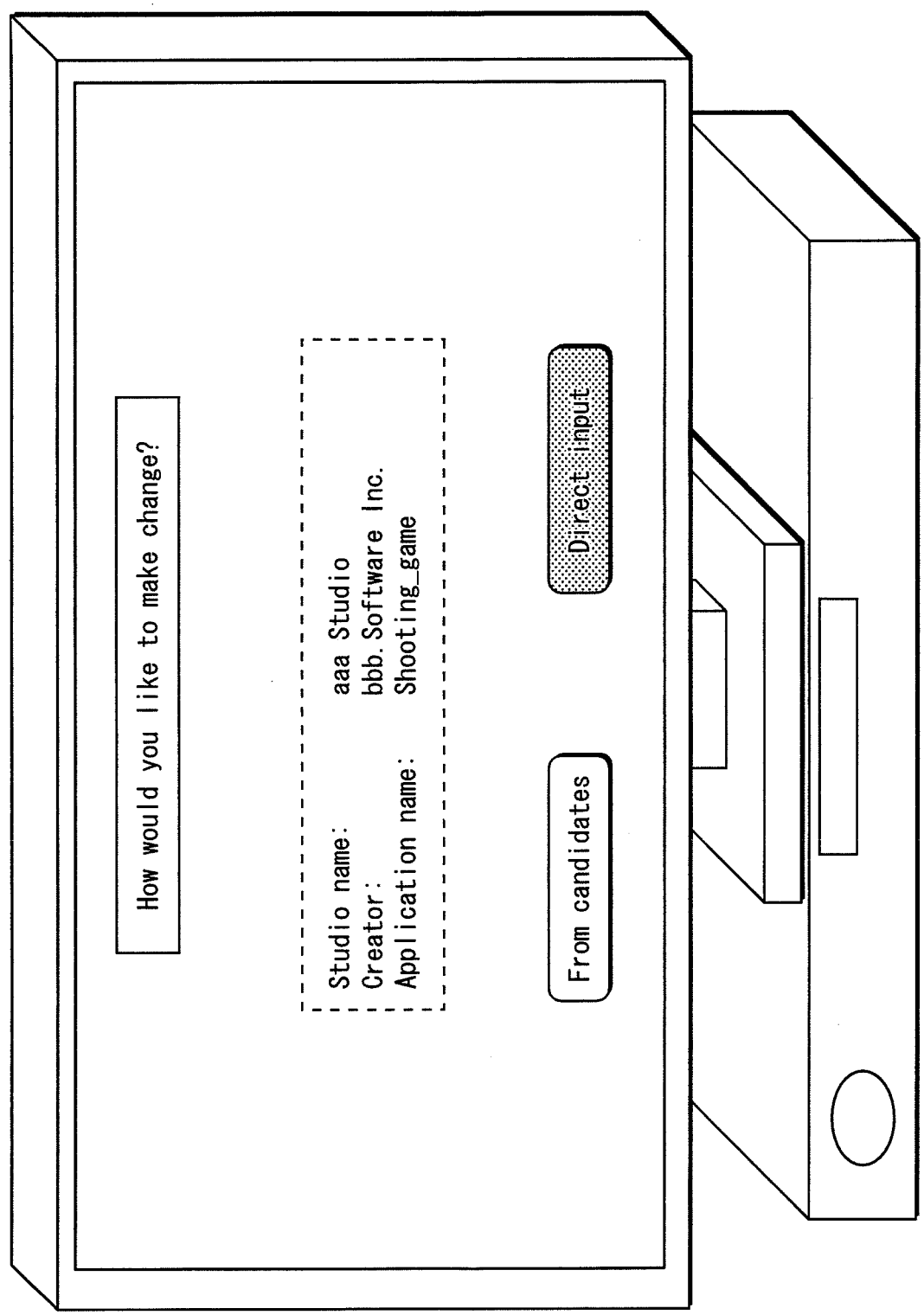
FIG. 23 shows one example of a display screen for entering user selection.
Figure 24:
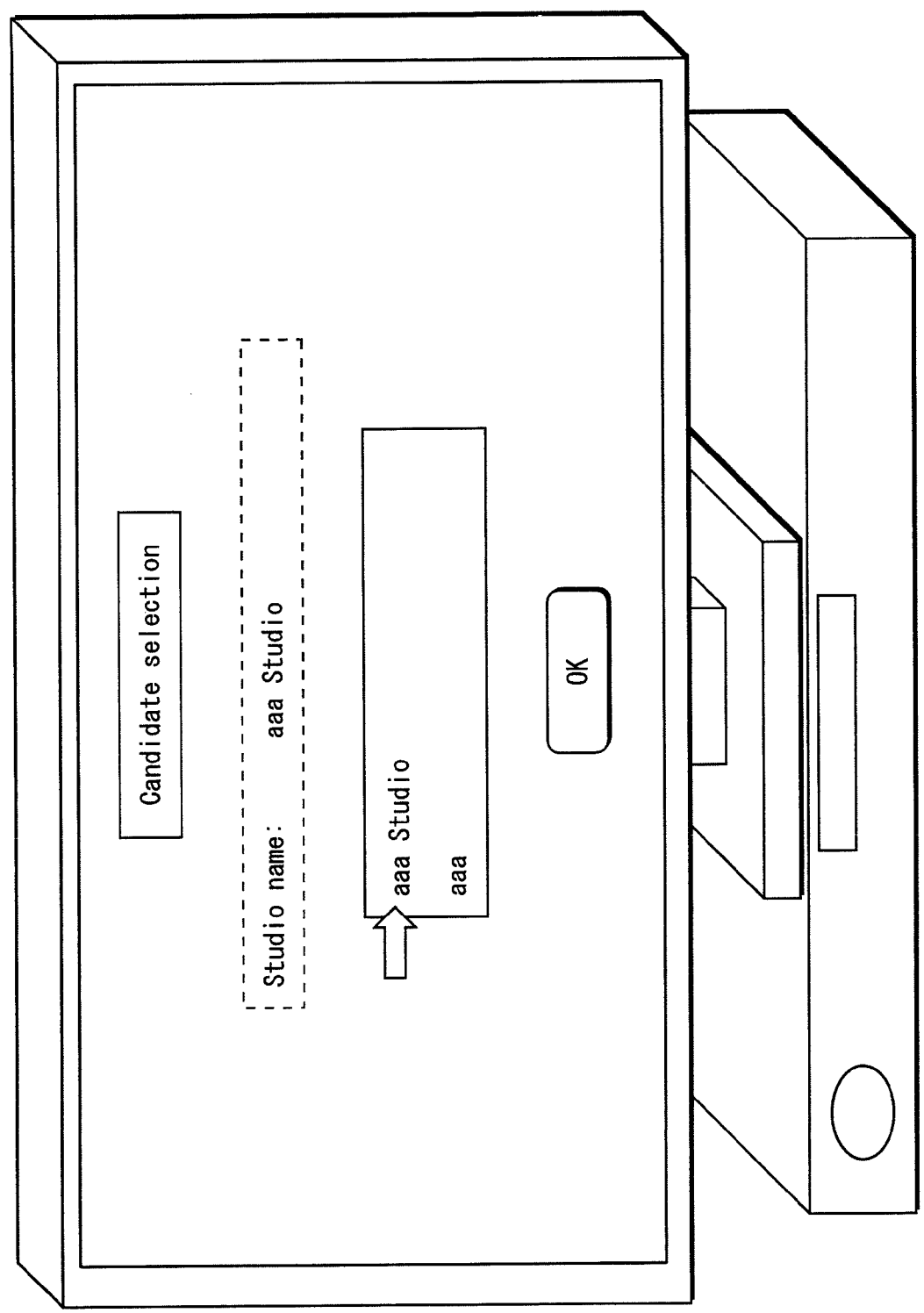
FIG. 24 shows one example of a display screen for selecting one of candidates.
Figure 25:
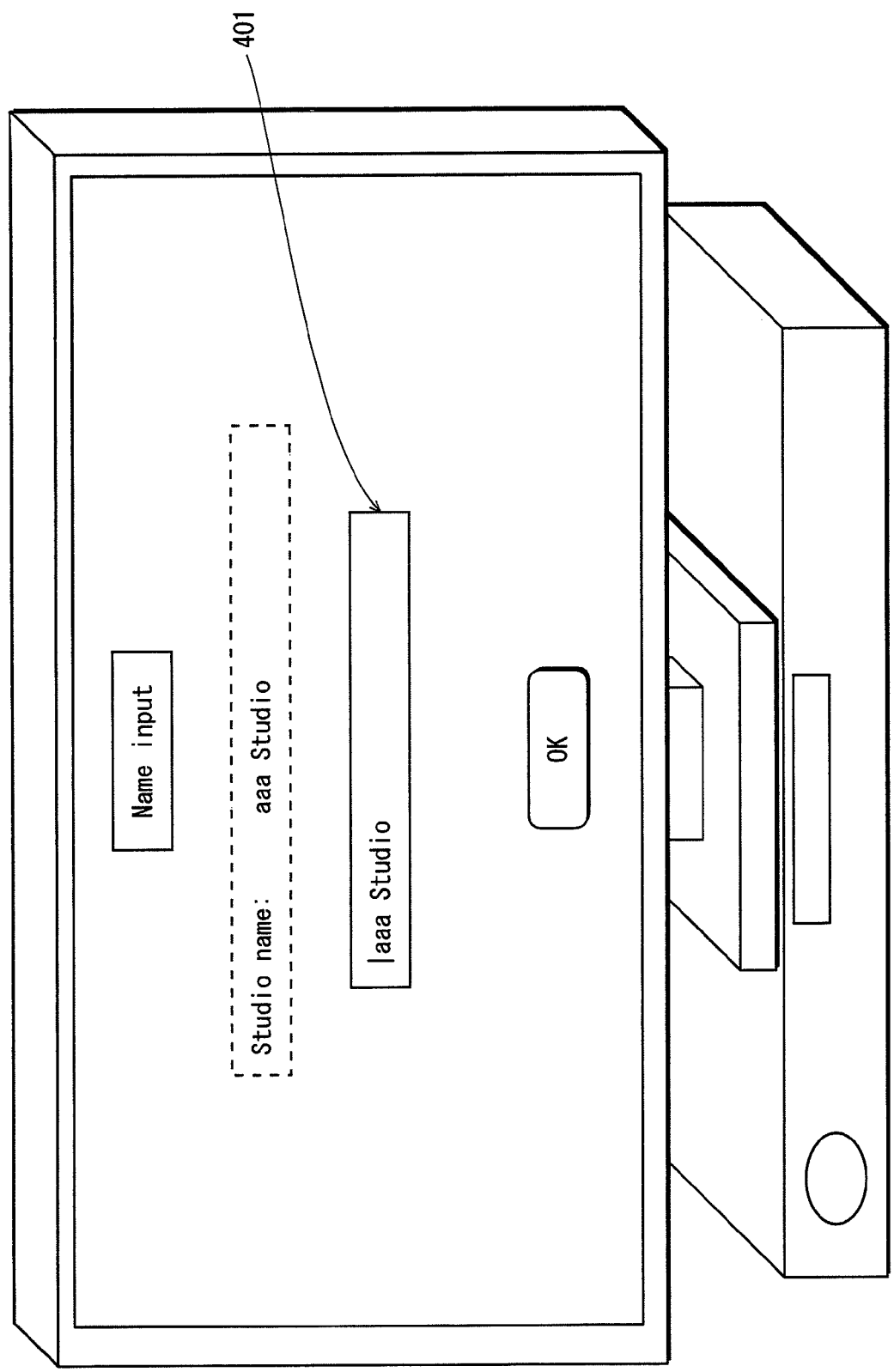
FIG. 25 shows one example of a display screen for entering a name.

For example, Steps S106 and S110 shown in FIG. 14 may be modified as shown in FIG. 22 according to which the rendering engine 22 renders a display screen that prompts the user for confirming whether or not to register the organization name with a default selected text string. If a negative UO is received, the rendering engine 22 is then caused to render a display screen as shown in FIG. 23 that prompts the user for deciding whether a text string is to be selected from those contained in the subject name or to be directly input by the user. Depending on the UO made on the selection screen, the rendering engine 22 is caused to render either of the display screens shown in FIGS. 24 and 25. The display screen shown in FIG. 24 is for presenting candidate text strings, whereas the display screen shown in FIG. 25 is for entering a name. As a result that a UO is made on either of the display screens, the text string to be used for the mapping is obtained. More specifically, the display screen shown in FIG. 24 is allows the user to select information used for the mapping process from among the listing of information items constituting the subject name. In the figure, information items of the subject name other than the organization name that is used for the association according to this embodiment. The display screen shown in FIG. 25 allows the user to directly enter an input to a text input box 401. The text string selected from among the candidates as shown in FIG. 24 or directly input as shown in FIG. 25 is registered into the mapping information in Steps S106 and S110 shown in FIG. 14, instead of the organization name described in the digital certificate. As shown in FIG. 25, the input screen may be rendered such that one of the information items of the subject name described in the digital certificate is displayed in the text input box 401 by default.

Embodiment 2

The META directory on the BD-ROM disc can contain a metafile storing various information relating to the disc. Examples of information stored in the metafile include the name of the disc, a thumbnail image representing the disc, creator information indicating the creator of the disc, and title creator information indicating each title on the disc.

According to the embodiment 1, the CertID directory and the OrganizationID directory are associated with information of the subject name described in the digital certificate that is stored in a Java archive file containing a signed application. Alternatively, however, it is useful to associate the directories with information stored in the metafile on the BD-ROM disc. An embodiment 2 of the present invention is directed to a configuration according to which information stored in a metafile is used in the mapping process.

Figure 26:
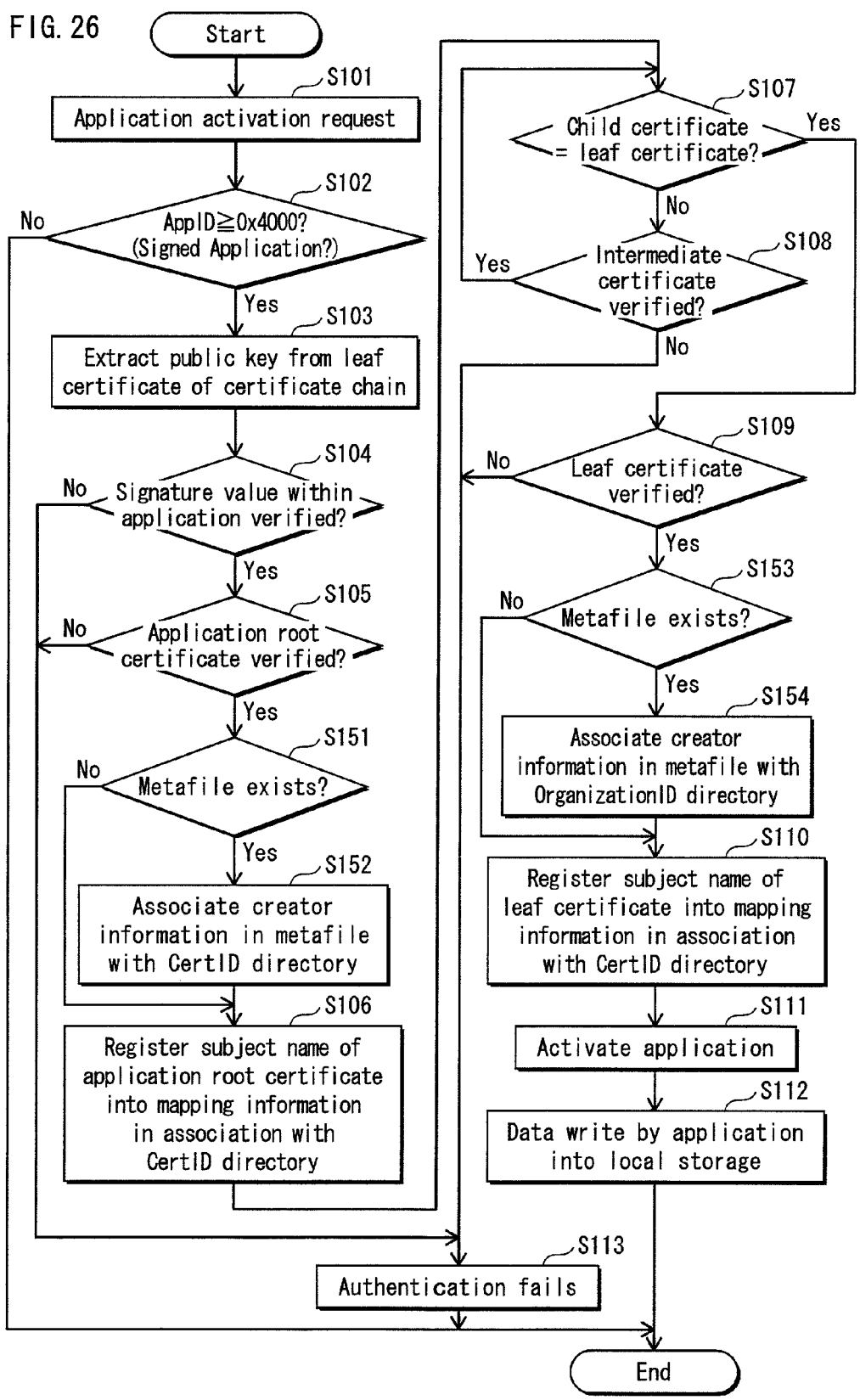
FIG. 26 is a flowchart showing the application activation involving a mapping process according to an embodiment 2.

FIG. 26 is a flowchart showing the mapping process performed with the use of information stored in a metafile.

The flowchart shown in FIG. 26 is based on the flowchart of the associating process shown in FIG. 14. In FIG. 26, Steps S151-S152 and S153-S154 are added. Through Steps S151-S152, it is first judged whether the BD-ROM disc has a metafile recorded thereon (S151). If it is judged in Step S151 that a metafile exists, an additional entry is registered into the mapping information, such that the CertID directory is associated with disc creator information stored in the metafile (S152). Through Steps S153-S154, it is first judged whether the BD-ROM disc has a metafile recorded thereon (S153). If it is judged in S153 that a metafile exists, an additional entry is registered into the mapping information, such that the OrganizationID directory is associated with title creator information stored in the metafile. Through the mapping process with the additional steps according to the embodiment 2, the mapping information as shown in FIG. 27 is created. As shown in FIG. 27, the CertID directory is associated with the disc creator information stored in the metafile, in addition to the subject name described in the application root certificate. Further, the OrganizationID directory is associated with title creator information stored in the metafile, in addition to the subject name described in the leaf certificate.

Note that the disc creator information stored in the metafile is information from which the disc creator is known. The metafile is in the xml format and the disc creator information specifically may be any of the "creator", "publisher", and "contributor" indicated by the discinfo attribute or any of the "name" and "alternative" of the Organization element indicated by titleinfo attribute.

Further, the title creator information stored in the metafile is information from which the organization corresponding to the organization ID is known. Similarly to the disc creator information, the title creator information may be any of the "creator", "publisher", and "contributor" indicated by the discinfo attribute or any of the "name" and "alternative" of the Organization element indicated by titleinfo attribute.

With the use of the mapping information described above, the display screen is rendered to present the state of the ADA area, by using the information stored in the metafile in addition to the information described in the digital certificate. With such a display screen, information about the target data files is presented in a manner to allow the user to infer the details and contents of the target data files even more easily.

Modification of Embodiment 2

(1) Information stored in a metafile may be added to mapping information at a time other than the time during the signature verification process that is performed upon activation of an application. For example, the addition of metafile information may be performed in advance, for example at the time of disc loading. It should be noted, however, with such advanced timing, the application for writing data into the ADA area is not yet activated. Therefore, there may be a risk that unnecessary information is uselessly registered into the mapping information.

Figure 28:
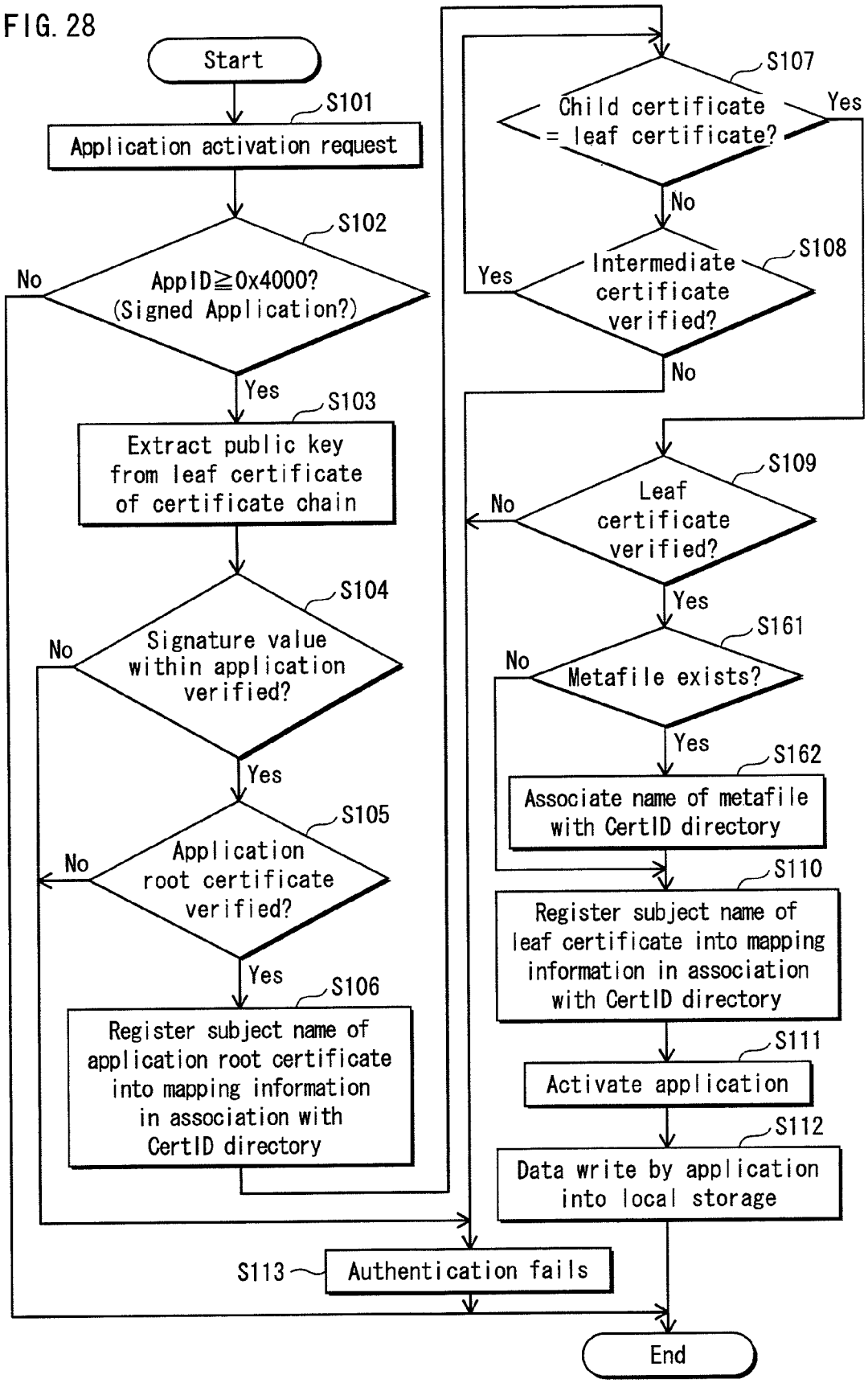
FIG. 28 is a flowchart showing the application activation involving a mapping process according to a modification.

(2) It is possible to associate directors with the file name of a metafile in the mapping process. FIG. 28 shows the flowchart of the mapping process according to which directories are associated with the name of a metafile.

The flowchart shown in FIG. 28 is based on the flowchart shown in FIG. 14. In FIG. 28, Steps S161-S162 are added. Through Steps S161-S162, it is first judged whether the BD-ROM disc has a metafile recorded thereon (S161). If it is judged in S161 that a metafile exists, the CertID directory and the OrganizationID directory are then associated with the name of the metafile and registered into the mapping information (S162). Through the mapping process according to this modification of the embodiment 2, the mapping information as shown in FIG. 29 is created. As shown in FIG. 29, the OrganizationID directory is associated with the name of the metafile as well as with the subject name described in the leaf certificate.

With the use of the mapping information shown in FIG. 29, the following is performed in the display screen presentation process. That is, the metafile is read with the name registered in the mapping information. Then, the disc creator information and title creator information related to the CertID directory and the OrganizationID directory are obtained from the read metafile. The display screen is rendered with the use of the thus obtained information.

(3) As described above, the mapping information may associate the directories with information stored in the metafile as well as with information described in the digital certificate. In such a case, the mapping information may additionally include a flag indicating which of the metafile information and the certificate information is to be used in priory.

(4) Note that a BD-ROM disc may or may not have a metafile recorded thereon. In view of this, the playback device may be configured to use information stored in a metafile for the association if the metafile exists on the BD-ROM, and otherwise use information described in a digital certificate.

For example, in the process procedure shown in FIG. 25, information of the metafile and information of the digital certificate are both registered into the local storage. Alternatively, however, as long as information of the metafile is available, the metafile information is solely used for the association, and thus the steps relating to information of the digital certificate (Step S106 and S110) may be omitted.

Specifically, the playback device may be configured to perform in the following manner. That is, if the application root certificate is successfully verified in Step S105 shown in FIG. 25, Step S151 is performed to judge whether or not a metafile exists on the BD-ROM disc. If no metafile exits (S151: No), Step S106 is performed to associate the CertID directory with the subject name described in the application root certificate. On the other hand, if a metafile exits (S151: Yes), Step S152 is performed to associate the CertID directory with the disc creator information stored in the metafile, and then the processing goes onto Step S107.

Similarly, the playback device may be configured to perform in the following manner. That is, if the leaf certificate is successfully verified in Step S109, Step S153 is then performed to judge whether or not a metafile exists on the BD-ROM disc. If no metafile exits (S153: No), then Step S110 is performed to associate the OrganizationID directory with the subject name described in the leaf certificate. On the other hand, if a metafile exits (S153: Yes), Step S154 is performed to associate the OrganizationID directory with the title creator information stored in the metafile, and then the processing goes onto Step S111.

Other Modifications

Although the present invention has been described by way of the above embodiments, it is naturally appreciated that the present invention is not limited to the specific embodiments described above. Various modifications including the following still fall within the scope of the present invention.

(1) The present invention may be embodied as a data management method composed of the process procedures shown in any of the flowcharts described in the embodiments. Further, the present invention may be embodied as a computer program composed of program code that causes a computer to perform any of the processing procedures described above. Still further, the present invention may be embodied as a digital signal representing such a computer program.

Still further, the present invention may be embodied as a computer-readable recording medium having recorded thereon any of the computer programs and digital signals mentioned above. For example, the computer-readable recording medium may be any of a flexible disk, a hard disk, CD-ROM, MO, DVD, DVD-ROM, DVD-RAM, BD (Blueray Disc), and a semiconductor memory.

Still further, the present invention may be embodied as any of the computer programs or the digital signals that can be transmitted via an electronic communication circuit, a wireless or wired communications circuit, and a network typified by the Internet, etc.

Still further, any of the programs or the digital signals may be recorded and distributed on a recording medium and any of the programs or the digital signals may be transferred via the network, etc., so that the present invention may be practiced by another independent computer system.

(2) The present invention may be embodied as an LSI for controlling a data management device according to any of the embodiments described above. Such an LSI is fabricated by integrating the functional blocks realized by the control unit 13 shown in FIG. 11. The functional blocks may separately be implemented as individual chips, or some or all of the functional blocks may be implemented into a single chip.

Although referred to as LSI here, the integrated circuit may also be referred to as IC, LSI, super LSI, or ultra LSI, depending on the packing density.

It should be further noted that the method for the circuit integration is not limited to LSI, and the integrated circuit may be implanted by a dedicated circuit or a general purpose processor. It is also possible to use an FPGA (Field Programmable Gate Array), which allows post manufacture programming of the LSI, or to use a reconfigurable processor, which allows reconfiguration of the connection between circuit cells within the LSI or setting of the circuit cells.

Furthermore, if the advance in the field of semiconductor technology or in another technology derived therefrom introduces a new integration technology that replaces the LSI, the new technology may be used to integrate the functional blocks. For example, the application of biotechnology is one possibility.

(3) According to the embodiments 1 and 2, the local storage built in the playback device is used as a readable and writable recording medium for storing data to be managed. It should be noted, however, that the features of the present invention do not rely on the physical property of the built-in local storage. The present invention is therefore applicable to other readable and writable recording mediums. For example the present invention is applicable to the case where data accessed by an application is stored on an external hard disk or a portable recording medium (semiconductor memory such as an SD card, CompactFlash (registered trademark)) attached to the playback device. The present invention still achieves the same advantageous effect as described above.

(4) According to the embodiments 1 and 2, the directories on the local storage for storing data files are described based on the ADA directory structure compliant with the BD-ROM standard. However, the present invention is applicable to any other directory structure as long as a data file is written into directories by an application and information regarding the application for each directory is obtained from a digital certificate etc. of the application.

For example, a television compliant with the middleware standard for an interactive television, such as MHP (Multimedia Home Platform)/OCAP (OpenCable Application Platform) executes an application program multiplexed on a TV broadcasting, in synchronism with the video content playback. As a result, a data file is recorded onto a readable and writable recording medium. The present invention is also applicable to manage data files recorded by such an interactive television having an middleware architecture compliant with the MHP/OCAP standard.

Specifically, an interactive television complaint with the MHP/OCAP standard is capable of acquiring, from the broadcast data, the Organization ID identifying the creator of an application program and the ID of the application per se. The application program is permitted to write data into the "OrganizationID directory", the "AppID directory" identified by the obtained IDs and also into their subordinate directories. Similarly to the BD-ROM standard, in addition, the MHP/OCAP standard requires that a signed application be attached with a X.509 digital certificate and the digital certificate is used for the signature verification. According to one possible application of the present invention to such an interactive television complaint with the MHP/OCAP standard, the names of "OrganizationID directory" and "AppID directory" on the local storage storing data files are associated with the subject name described in the digital certificate.

(5) The first and second embodiments described above are directed to the playback device having the function of BD-ROM playback. It is naturally appreciated, however, that the present invention may be applicable to a playback device having a recording function in addition to the playback function.

(6) The present invention may be embodied as any combination of the embodiments and modifications described above.

INDUSTRIAL APPLICABILITY

The data management device and data management method according to the present invention are useful technique for effectively managing data stored on the local storage and applicable to various devices including BD-ROM players.

The invention claimed is:

1. A data management device for managing data written into a restricted area on a readable and writable recording medium by executing application programs, the restricted area being protected against any access other than by application programs verified based on a plurality of digital certificates, and each of a plurality of directories within the restricted area being accessible by a different one of the application programs, each digital certificate including a chain of a plurality of certificate portions, one of the plurality of certificate portions being a root certificate portion verifying a subordinate certificate portion and another of the plurality of certificate portions being a leaf certificate portion being verified by a superordinate certificate portion, each certificate portion of the plurality of certificate portions having, as text information relating to an owner of a corresponding one of the digital certificates, subject name information described therein, a directory accessible by a given one of the application programs being an application directory into which data is written by executing the given application program and is subordinate to an organization directory that is specified by a digital certificate attached to the given application program and that in turn is subordinate to a root certificate directory also specified by the digital certificate attached to the given application program, the data management device comprising:

a verifier device that verifies an authenticity of an application program by extracting a public key from a leaf certificate included in a certificate chain of a plurality of certificate portions included in a digital certificate attached to the application program, and verifying, with use of the public key, a signature value that is acquired directly from the application;

a mapper that, if the application program is verified, associates a directory accessible by the application program out of the plurality of directories with text information that is included in the digital certificate used for the verification and that relates to an owner of the digital certificate, the association by the mapper associating the specified organization directory with the subject name information described in the leaf certificate, and the specified root certificate directory with the subject name information described in the root certificate; and a presenter that extracts root certificate directories and organization directories in which data is written, creates, for each extracted root certificate directory and each extracted organization directory, one entry including the extracted directory and text information associated with the extracted directory, and presents the created entries.

2. The data management device according to claim 1, wherein the association is established by using an information item selected out of a country name, an organization name, an organization unit, and a common name that are included in the subject name information.

3. The data management device according to claim 2, wherein the mapper associates the specified organization directory with the subject name information described in the leaf certificate portion, by using a text string that is obtained by removing, from the organization name included in the subject name information, an organization ID attached at an end of the organization name.

4. The data management device according to claim 2, wherein the mapper receives a user selection selecting which of the information items included in the subject name information is to be used in the association.

5. The data management device according to claim 1, wherein the application program is included in a virtual package created by merging data on a disc loaded into a playback device that executes the application program with data on the recording medium provided to the playback device, the virtual package includes application management information indicating details of the application program, and the mapper further associates the application directory with a name of the application program indicated by the application management information.

6. The data management device according to claim 1, wherein the application program is included in a virtual package created by merging data on a disc loaded into a playback device that executes the application program with data on the recording medium provided to the playback device, the virtual package includes application management information indicating details of the application program, and the mapper further associates the application directory with information relating to an icon that is specified by the application management information as denoting the application program.

7. A data management device for managing data written into a restricted area on a readable and writable recording medium by executing application programs, the restricted area being protected against any access other than by application programs verified based on a plurality of digital certificates, and each of a plurality of directories within the restricted area being accessible by a different one of the application programs, each digital certificate including a chain of a plurality of certificate portions, one of the plurality of certificate portions being a root certificate portion verifying a subordinate certificate portion and another of the plurality of certificate portions being a leaf certificate portion being verified by a superordinate certificate portion, each certificate portion of the plurality of certificate portions having, as text information relating to an owner of a corresponding one of the digital certificates, subject name information described therein, a directory accessible by a given one of the application programs being an application directory into which data is written by executing the given application program and is subordinate to an organization directory that is specified by a digital certificate attached to the given application program and that in turn is subordinate to a root certificate directory also specified by the digital certificate attached to the given application program, the data management device comprising:

a verifier device that verifies an authenticity of an application program by extracting a public key from a leaf certificate included in a certificate chain of a plurality of certificate portions included in a digital certificate attached to the application program, and verifying, with use of the public key, a signature value that is acquired directly from the application;

a mapper that, if the application program is verified, associates a directory accessible by the application program out of the plurality of directories with text information that is included in the digital certificate used for the verification and that relates to an owner of the digital certificate, the association by the mapper associating the specified organization directory with the subject name information described in the leaf certificate, and the specified root certificate directory with the subject name information described in the root certificate; and a presenter that extracts root certificate directories and organization directories in which data is written, creates, for each extracted root certificate directory and each extracted organization directory, one entry including the extracted directory and text information associated with the extracted directory, and presents the created entries, wherein the verification of the application program by the verifier is processed before the application program is activated for execution, and the association by the mapper is performed with the verification process.

8. A data management device for managing data written into a restricted area on a readable and writable recording medium by executing application programs, the restricted area being protected against any access other than by application programs verified based on a plurality of digital certificates, and each of a plurality of directories within the restricted area being accessible by a different one of the application programs, each digital certificate including a chain of a plurality of certificate portions, one of the plurality of certificate portions being a root certificate portion verifying a subordinate certificate portion and another of the plurality of certificate portions being a leaf certificate portion being verified by a superordinate certificate portion, each certificate portion of the plurality of certificate portions having, as text information relating to an owner of a corresponding one of the digital certificates, subject name information described therein, a directory accessible by a given one of the application programs being an application directory into which data is written by executing the given application program and is subordinate to an organization directory that is specified by a digital certificate attached to the given application program and that in turn is subordinate to a root certificate directory also specified by the digital certificate attached to the given application program, the data management device comprising:

a verifier device that verifies an authenticity of an application program by extracting a public key from a leaf certificate included in a certificate chain of a plurality of certificate portions included in a digital certificate attached to the application program, and verifying, with use of the public key, a signature value that is acquired directly from the application;

a mapper that, if the application program is verified, associates a directory accessible by the application program out of the plurality of directories with text information that is included in the digital certificate used for the verification and that relates to an owner of the digital certificate, the association by the mapper associating the specified organization directory with the subject name information described in the leaf certificate, and the specified root certificate directory with the subject name information described in the root certificate; and a presenter that extracts root certificate directories and organization directories in which data is written, creates, for each extracted root certificate directory and each extracted organization directory, one entry including the extracted directory and text information associated with the extracted directory, and presents the created entries, wherein the application program is included in a virtual package created by merging data on a disc loaded into a playback device that executes the application program with data on the recording medium provided to the playback device, the virtual package includes a metafile indicating details of the application program, and the mapper further establishes the association by using information contained in the metafile.

9. The data management device according to claim 8, wherein the mapper that establishes the association by using text information relating to a recipient of the digital certificate and included in the digital certificate, if the virtual package does not include the metafile.

10. A data management device for managing data written into a restricted area on a readable and writable recording medium by executing application programs, the restricted area being protected against any access other than by application programs verified based on a plurality of digital certificates, and each of a plurality of directories within the restricted area being accessible by a different one of the application programs, each certificate portion of the plurality of certificate portions having as text information relating to an owner of a corresponding one of the digital certificates, subject name information described therein, a directory accessible by a given one of the application programs being an application directory into which data is written by executing the given application program and is subordinate to an organization directory that is specified by a digital certificate attached to the given application program and that in turn is subordinate to a root certificate directory also specified by the digital certificate attached to the given application program, the data management device comprising:

a text-string receiving circuit that receives a user input of text information;

a verifier that verifies an authenticity of an application program by extracting a public key from a leaf certificate included in a certificate chain of a plurality of certificate portions included in a digital certificate attached to the application program, and verifying, with use of the public key, a signature value that is acquired directly from the application;

a mapper that receives, if the application program is verified, a user input selecting whether or not the text information received by the text-string receiving circuit is to be used, and associates, if the received user input indicates not to use the received text information, a directory accessible by the application program out of the plurality of directories with text information included in the digital certificate and relating to an owner of the digital certificate used for the verification, the association by the mapper associating the specified organization directory with the subject name information described in the leaf certificate, and the specified root certificate directory with the subject name information described in the root certificate, and associates, if the received user input indicates to use the received text information, the directory accessible by the application program out of the plurality of directories with the text information received by the text-string receiving circuit instead of with the text information included in the digital certificate and relating to an owner of the digital certificate used for the verification; and a presenter that extracts root certificate directories and organization directories in which data is written, creates, for each extracted root certificate directory and each extracted organization directory, one entry including the extracted directory and text information associated with the extracted directory, and presents the created entries.

11. The data management device according to claim 10, wherein
the text-string receiving circuit receives input of the text-string via an entry field presented on a display screen, and
the entry field is presented by default with a text string contained in the subject-name information.

12. A non-transitory computer readable medium storing a computer program for controlling a computer to manage data written into a restricted area on a readable and writable recording medium by executing application programs, the restricted area being protected against any access other than by application programs verified based on a plurality of digital certificates, and each of a plurality of directories within the restricted area being accessible by a different one of the application programs, the computer program comprising code that causes the computer to perform:
verifying an authenticity of an application program based on a digital certificate attached to the application program;
associating, if the application program is verified, a directory accessible by the application program out of the plurality of directories with text information that is included in the digital certificate used for the verification and that relates to an owner of the digital certificate; and
presenting information relating to data written into the directory accessible by the application program, by using the text information associated with the directory, wherein
the digital certificate includes a plurality of certificate portions,
the digital certificate includes a root certificate portion verifying a subordinate certificate portion and a leaf certificate portion being verified by a superordinate certificate portion,
each certificate portion of the plurality of certificates has, as the text information, subject name information described therein, the digital certificate attached to the application program includes information specifying an organization directory superordinate to an application directory into which data is written by executing the application program, and a root certificate directory superordinate to the specified organization directory, and the directory accessible by the application program is the application directory that is subordinate to the specified organization directory that in turn is subordinate to the specified root certificate directory, and
the association of the directory with text information associates the specified organization directory with the subject name information described in the leaf certificate, and the specified root certificate directory with the subject name information described in the root certificate.

13. A data management method for managing data written into a restricted area on a readable and writable recording medium by executing application programs, the restricted area being protected against any access other than by application programs verified based on a plurality of digital certificates, and each of a plurality of directories within the restricted area being accessible by a different one of the application programs, the data management method comprising:
verifying by a computer processor an authenticity of an application program based on a digital certificate attached to the application program;
associating, if the application program is verified, a directory accessible by the application program out of the plurality of directories with text information that is included in the digital certificate used for the verification and that relates to an owner of the digital certificate; and
presenting information relating to data written into the directory accessible by the application program, by using the text information associated with the directory, wherein
the digital certificate includes a plurality of certificate portions,
the digital certificate includes a root certificate portion verifying a subordinate certificate portion and a leaf certificate portion being verified by a superordinate certificate portion,
each certificate portion of the plurality of certificate portions has, as the text information, subject name information described therein,
the digital certificate attached to the application program includes information specifying an organization directory superordinate to an application directory into which data is written by executing the application program, and a root certificate directory superordinate to the specified organization directory, and the directory that is accessible by the application program is the application directory that is subordinate to the specified organization directory that in turn is subordinate to the specified root certificate directory, and
the association of the directory with text information associates the specified organization directory with the subject name information described in the leaf certificate, and the specified root certificate directory with the subject name information described in the root certificate.

14. A non-transitory computer readable medium storing a computer program for controlling a computer to manage data written into a restricted area on a readable and writable recording medium by executing application programs, the restricted area being protected against any access other than by application programs verified based on a plurality of digital certificates, and each of a plurality of directories within the restricted area being accessible by a different one of the application programs, the computer program comprising code that causes the computer to perform:
verifying, before an application program is activated for execution, an authenticity of the application program based on a digital certificate attached to the application program;
associating, if the application program is verified, a directory accessible by the application program out of the plurality of directories with text information that is included in the digital certificate used for the verification and that relates to an owner of the digital certificate, the associating being performed with the verifying; and
presenting information relating to data written into the directory accessible by the application program, by using the text information associated with the directory.

15. A data management method for managing data written into a restricted area on a readable and writable recording medium by executing application programs, the restricted area being protected against any access other than by application programs verified based on a plurality of digital certificates, and each of a plurality of directories within the restricted area being accessible by a different one of the application programs, the data management method comprising:
verifying, by a computer processor before an application is activated for execution, an authenticity of the application program based on a digital certificate attached to the application program;
associating, if the application program is verified, a directory accessible by the application program out of the plurality of directories with text information that is included in the digital certificate used for the verification and that relates to an owner of the digital certificate, the associating being performed with the verifying; and
presenting information relating to data written into the directory accessible by the application program, by using the text information associated with the directory.

16. A non-transitory computer readable medium storing a computer program for controlling a computer to manage data written into a restricted area on a readable and writable recording medium by executing application programs, the restricted area being protected against any access other than by application programs verified based on a plurality of digital certificates, and each of a plurality of directories within the restricted area being accessible by a different one of the application programs,
each digital certificate including a chain of a plurality of certificate portions, one of the plurality of certificate portions being a root certificate portion verifying a subordinate certificate portion and another of the plurality of certificate portions being a leaf certificate portion being verified by a superordinate certificate portion,
each certificate portion of the plurality of certificate portions having, as text information relating to an owner of a corresponding one of the digital certificates, subject name information described therein,
a directory accessible by a given one of the application programs being an application directory into which data is written by executing the given application program and is subordinate to an organization directory that is specified by a digital certificate attached to the given application program and that in turn is subordinate to a root certificate directory also specified by the digital certificate attached to the given application program,
the computer program comprising code that causes the computer to perform:
verifying authenticity of an application program based on a digital certificate attached to the application program;
associating, if the application program is verified, a directory accessible by the application program out of the plurality of directories with text information that is included in the digital certificate used for the verification and that relates to an owner of the digital certificate, the associating being performed by associating the specified organization directory with the subject name information described in the leaf certificate, and the specified root certificate directory with the subject name information described in the root certificate; and
presenting information relating to data written into the directory accessible by the application program, by using the text information associated with the directory, wherein
the application program is included in a virtual package created by merging data on a disc loaded into a playback device that executes the application program with data on the recording medium that the playback device is provided with,
the virtual package includes a metafile indicating details of the application program, and
the associating of the directory with text information is established by further using information contained in the metafile.

17. A data management method for managing data written into a restricted area on a readable and writable recording medium by executing application programs, the restricted area being protected against any access other than by application programs verified based on a plurality of digital certificates, and each of a plurality of directories within the restricted area being accessible by a different one of the application programs,
each digital certificate including a chain of a plurality of certificate portions, one of the plurality of certificate portions being a root certificate portion verifying a subordinate certificate portion and another of the plurality of certificate portions being a leaf certificate portion being verified by a superordinate certificate portion,
each certificate portion of the plurality of certificate portions having, as text information relating to an owner of a corresponding one of the digital certificates, subject name information described therein,
a directory accessible by a given one of the application programs being an application directory into which data is written by executing the given application program and is subordinate to an organization directory that is specified by a digital certificate attached to the given application program and that in turn is subordinate to a root certificate directory also specified by the digital certificate attached to the given application program,
the data management method comprising:
verifying by a computer processor an authenticity of an application program based on a digital certificate attached to the application program;
associating, if the application program is verified, a directory accessible by the application program out of the plurality of directories with text information that is included in the digital certificate used for the verification and that relates to an owner of the digital certificate, the associating being performed by associating the specified organization directory with the subject name information described in the leaf certificate, and the specified root certificate directory with the subject name information described in the root certificate; and
presenting information relating to data written into the directory accessible by the application program, by using the text information associated with the directory, wherein
the application program is included in a virtual package created by merging data on a disc loaded into a playback device that executes the application program with data on the recording medium provided to the playback device,
the virtual package includes a metafile indicating details of the application program, and
the associating of the directory with the text information is established by further using information contained in the metafile.

18. A non-transitory computer readable medium storing a computer program for controlling a computer to manage data written into a restricted area on a readable and writable recording medium by executing application programs, the restricted area being protected against any access other than by application programs verified based on a plurality of digital certificates, and each of a plurality of directories within the restricted area being accessible by a different one of the application programs, the computer program comprising code that causes the computer to perform:

receiving a user input of text information;

verifying an authenticity of an application program based on a digital certificate attached to the application program;

receiving, if the application program is verified, a user input selecting whether or not the text information received is to be used; and associating a directory accessible by the application program out of the plurality of directories with text information included in the digital certificate and relating to an owner of the digital certificate used for the verification, if the received user input indicates not to use the received text information, and with the text information received, if the received user input indicates to use the received text information; and presenting present information relating to data written into the directory accessible by the application program, by using the text information associated with the directory.

19. A data management method for managing data written into a restricted area on a readable and writable recording medium by executing application programs, the restricted area being protected against any access other than by application programs verified based on a plurality of digital certificates, and each of a plurality of directories within the restricted area being accessible by a different one of the application programs, the data management method comprising:

receiving by a computer processor a user input of text Information;

verifying an authenticity of an application program based on a digital certificate attached to the application program;

receiving, if the application program is verified, a user input selecting whether or not the text information received is to be used; and associating a directory accessible by the application program out of the plurality of directories with text information included in the digital certificate and relating to an owner of the digital certificate used for the verification, if the received user input indicates not to use the received text information, and with the text information received, if the received user input indicates to use the received text information; and presenting present information relating to data written into the directory accessible by the application program, by using the text information associated with the directory.

* * * * *